United States Patent
Yamazaki et al.

(10) Patent No.: US 11,846,542 B2
(45) Date of Patent: Dec. 19, 2023

(54) PHOTOELECTRIC CONVERSION APPARATUS USING AVALANCHE PHOTODIODES WITH DIFFERENT SENSITIVITY TO LIGHT

(71) Applicant: CANON KABUSHIKI KAISHA, Tokyo (JP)

(72) Inventors: Kazuo Yamazaki, Kanagawa (JP); Yukihiro Kuroda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 71 days.

(21) Appl. No.: 17/338,065

(22) Filed: Jun. 3, 2021

(65) Prior Publication Data
US 2021/0389176 A1 Dec. 16, 2021

(30) Foreign Application Priority Data
Jun. 11, 2020 (JP) .................................. 2020-101617

(51) Int. Cl.
*G01J 1/44* (2006.01)
*H04N 25/75* (2023.01)
*H04N 25/702* (2023.01)
*H04N 25/772* (2023.01)

(52) U.S. Cl.
CPC .............. *G01J 1/44* (2013.01); *H04N 25/702* (2023.01); *H04N 25/75* (2023.01); *H04N 25/772* (2023.01); *G01J 2001/4466* (2013.01)

(58) Field of Classification Search
CPC .... H04N 25/702; H04N 25/75; H04N 25/772; G01J 1/44; G01J 2001/4466; G01J 2001/442
See application file for complete search history.

(56) References Cited

U.S. PATENT DOCUMENTS

| | | | |
|---|---|---|---|
| 11,309,440 B2* | 4/2022 | Ota | H04N 23/749 |
| 2011/0050969 A1 | 3/2011 | Nishihara | |
| 2013/0248689 A1* | 9/2013 | Eldesouki | H04N 25/772 |
| | | | 250/208.1 |
| 2015/0115131 A1 | 4/2015 | Webster | |
| 2016/0020235 A1 | 1/2016 | Yamashita | |
| 2017/0186798 A1 | 6/2017 | Yang | |

(Continued)

FOREIGN PATENT DOCUMENTS

| | | |
|---|---|---|
| JP | 2018-81945 A1 | 5/2018 |
| JP | 2018512573 A | 5/2018 |

(Continued)

*Primary Examiner* — Lin Ye
*Assistant Examiner* — John H Morehead, III
(74) *Attorney, Agent, or Firm* — CANON U.S.A., INC. IP Division

(57) ABSTRACT

A photoelectric conversion apparatus includes a pixel and a counter circuit. The pixel includes a first avalanche photodiode and a second avalanche photodiode having different sensitivity to light. The counter circuit is configured to count a first signal based on charges generated in the first avalanche photodiode, and a second signal based on charges generated in the second avalanche photodiode. Processing on the count value is different between a case where a count value output from the counter circuit is larger than a threshold value and a case where the count value output from the counter circuit is smaller than the threshold value.

31 Claims, 15 Drawing Sheets

(56) References Cited

U.S. PATENT DOCUMENTS

| | | | |
|---|---|---|---|
| 2017/0221947 A1* | 8/2017 | Shishido | H01L 27/14609 |
| 2018/0270405 A1* | 9/2018 | Ota | H04N 25/778 |
| 2019/0068908 A1* | 2/2019 | Kobayashi | H04N 25/40 |
| 2019/0189827 A1 | 6/2019 | Haraguchi | |
| 2019/0252442 A1 | 8/2019 | Tanaka | |
| 2020/0021767 A1* | 1/2020 | Ikedo | H01L 31/035272 |
| 2020/0033482 A1* | 1/2020 | Negishi | G01J 1/44 |
| 2020/0045251 A1* | 2/2020 | Koizumi | H04N 25/79 |
| 2020/0304736 A1* | 9/2020 | Shinohara | H01L 31/02027 |
| 2020/0314375 A1* | 10/2020 | Nishino | G01S 7/486 |

FOREIGN PATENT DOCUMENTS

| | | |
|---|---|---|
| JP | 2018-157387 A | 10/2018 |
| JP | 2018157387 A | 10/2018 |
| JP | 2019107823 A | 7/2019 |
| JP | 2019140137 A | 8/2019 |
| WO | 2018/186195 A1 | 10/2018 |

\* cited by examiner

PLAN VIEW

CROSS-SECTIONAL VIEW

PHOTOELECTRIC CONVERSION APPARATUS USING AVALANCHE PHOTODIODES WITH DIFFERENT SENSITIVITY TO LIGHT

BACKGROUND

Technical Field

One disclosed aspect of the embodiments relates to a photoelectric conversion apparatus and an imaging system.

Description of the Related Art

There has been an expectation for the application of semiconductor apparatuses capable of detecting weak light at a single photon level, to a wide range of fields. In particular, a technique called photon counting has attracted attention. In photon counting, the luminance of incident light, which has conventionally been handled as a continuous value, is accurately counted as a discrete value, i.e., the number of photons.

Examples of light detecting elements that implement photon counting include an avalanche photodiode (hereinafter also referred to as an APD). Using the avalanche multiplication phenomenon generated by an intense electric field induced in a pn junction of a semiconductor, the APD amplifies about several times to a million times the amount of signal charges excited by photons. The use of the high gain characteristics of the avalanche multiplication phenomenon makes it possible to largely amplify a weak light signal to improve the signal-to-noise (S/N) ratio of readout noise occurring in a readout circuit. Thus, a luminance resolution at a single photon level can be achieved.

Japanese Unexamined Patent Application Publication (Translation of PCT Application) No. 2018-512573 discusses an imaging apparatus having an array including a plurality of single photon avalanche photodiodes (SPADs). In the array of the imaging apparatus discussed in Japanese Unexamined Patent Application Publication (Translation of PCT Application) No. 2018-512573, at least two different detection regions are sectioned. The imaging apparatus discussed in Japanese Unexamined Patent Application Publication (Translation of PCT Application) No. 2018-512573 has at least one signal output terminal for each of the two detection regions. Japanese Unexamined Patent Application Publication (Translation of PCT Application) No. 2018-512573 discusses a method for expanding the effective dynamic range by obtaining a characteristic curve based on two different signals output from the two detection regions.

However, the technique discussed in Japanese Unexamined Patent Application Publication (Translation of PCT Application) No. 2018-512573 has an issue of complicated signal processing since a characteristic curve needs to be obtained based on the two signals.

SUMMARY

One aspect of the embodiments is directed to a technique of simplifying signal processing of a photoelectric conversion apparatus that uses avalanche photodiodes.

According to an aspect of the embodiments, a photoelectric conversion apparatus includes a pixel and a counter circuit. The pixel includes a first avalanche photodiode and a second avalanche photodiode having different sensitivity to light. The counter circuit is configured to count a first signal based on charges generated in the first avalanche photodiode, and a second signal based on charges generated in the second avalanche photodiode. Processing on the count value is different between a case where a count value output from the counter circuit is larger than a threshold value and a case where the count value output from the counter circuit is smaller than the threshold value.

Further features of the disclosure will become apparent from the following description of exemplary embodiments with reference to the attached drawings.

DESCRIPTION OF THE EMBODIMENTS

A photoelectric conversion apparatus and a method for driving the photoelectric conversion apparatus according to a first exemplary embodiment will be described with reference to FIGS. 1 to 8.

Figure 1:
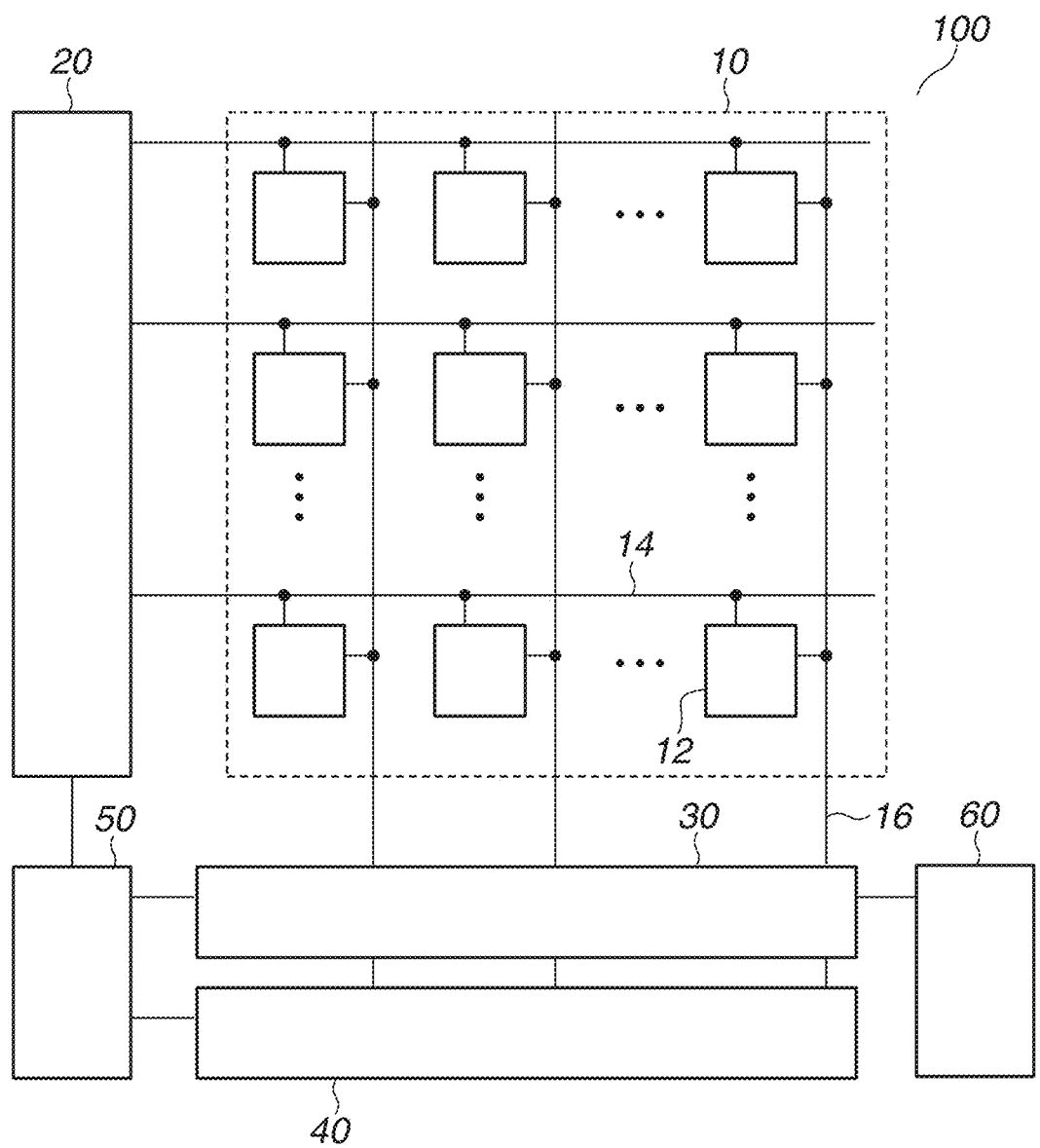
FIG. 1 is a schematic view illustrating a photoelectric conversion apparatus according to a first exemplary embodiment.
Figure 2:
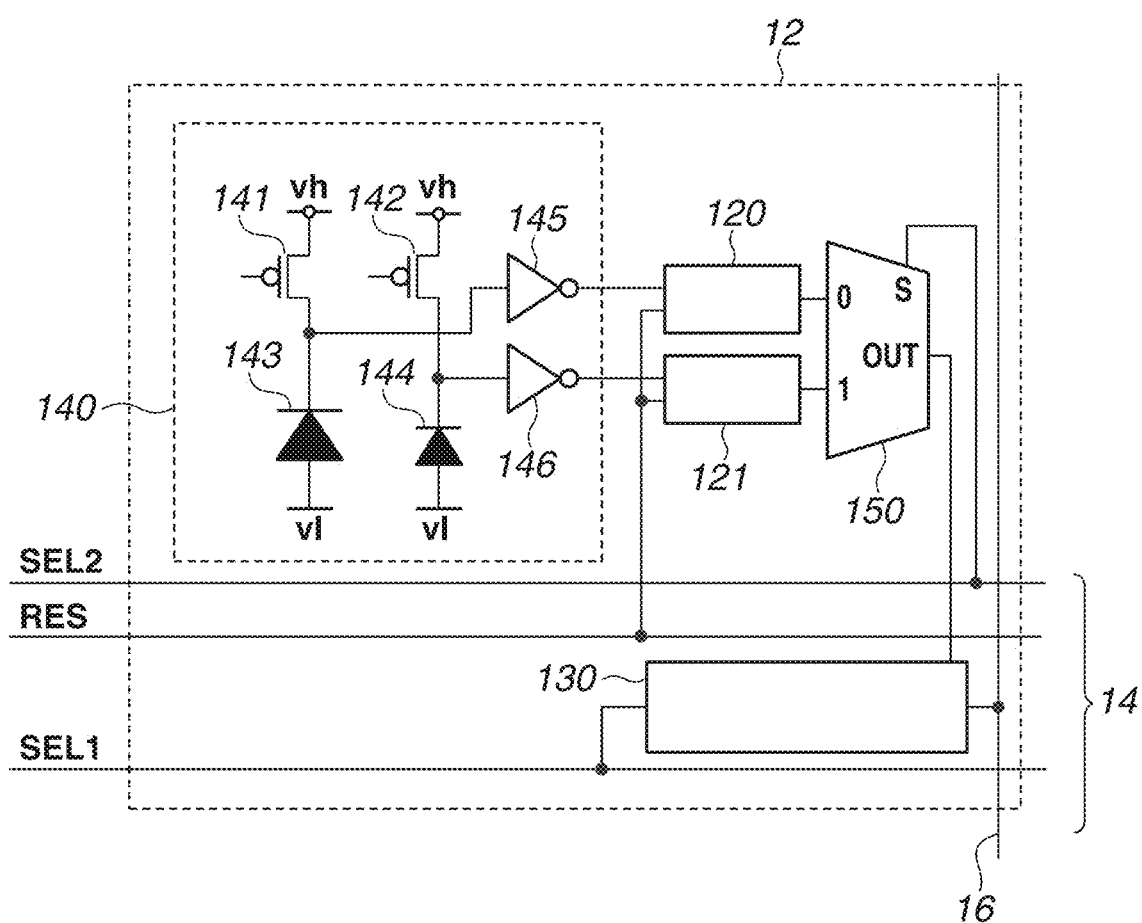
FIG. 2 is a circuit diagram illustrating an example configuration of a pixel circuit of the photoelectric conversion apparatus according to the first exemplary embodiment.
Figure 3A:
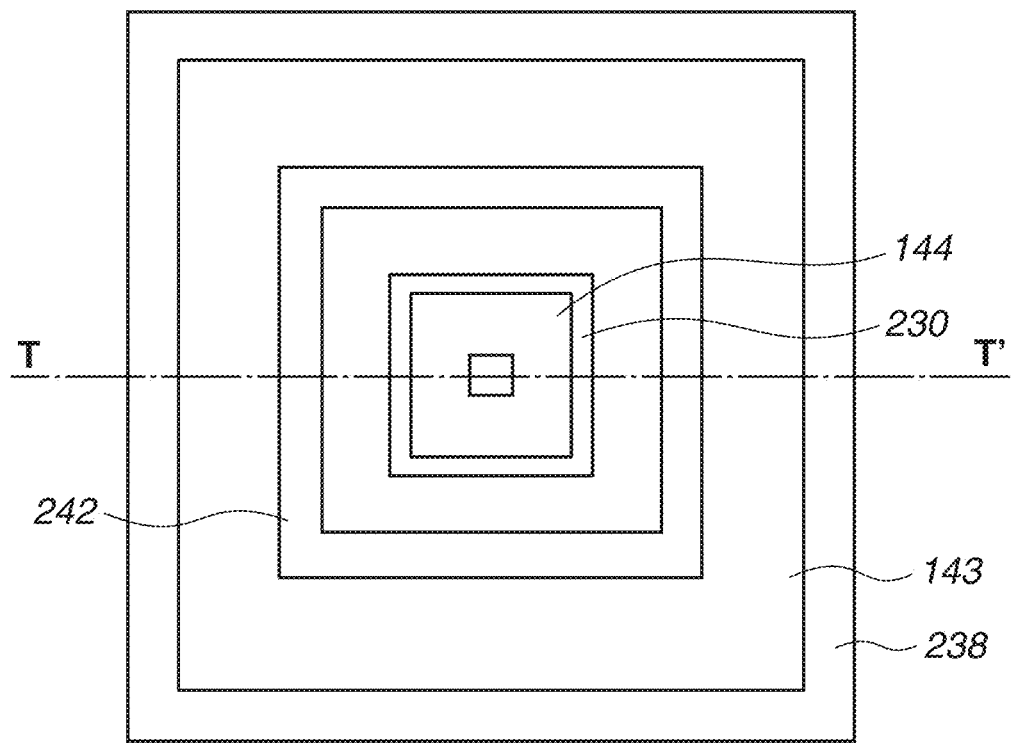
FIGS. 3A and 3B are a plan view and a cross-sectional view, respectively, schematically illustrating an example configuration of avalanche photodiodes (APDs) of a pixel of the photoelectric conversion apparatus according to the first exemplary embodiment.
Figure 3B:
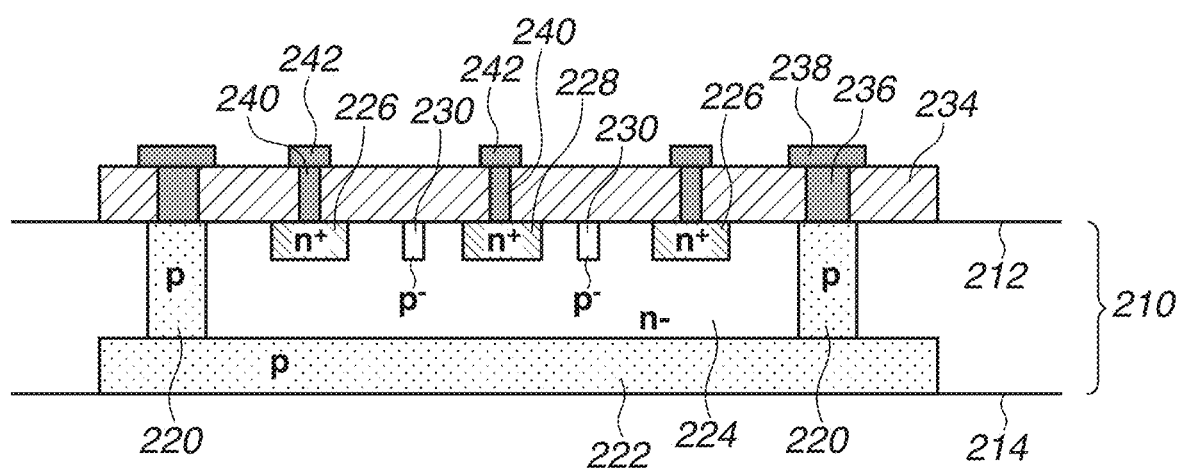
Figure 4:
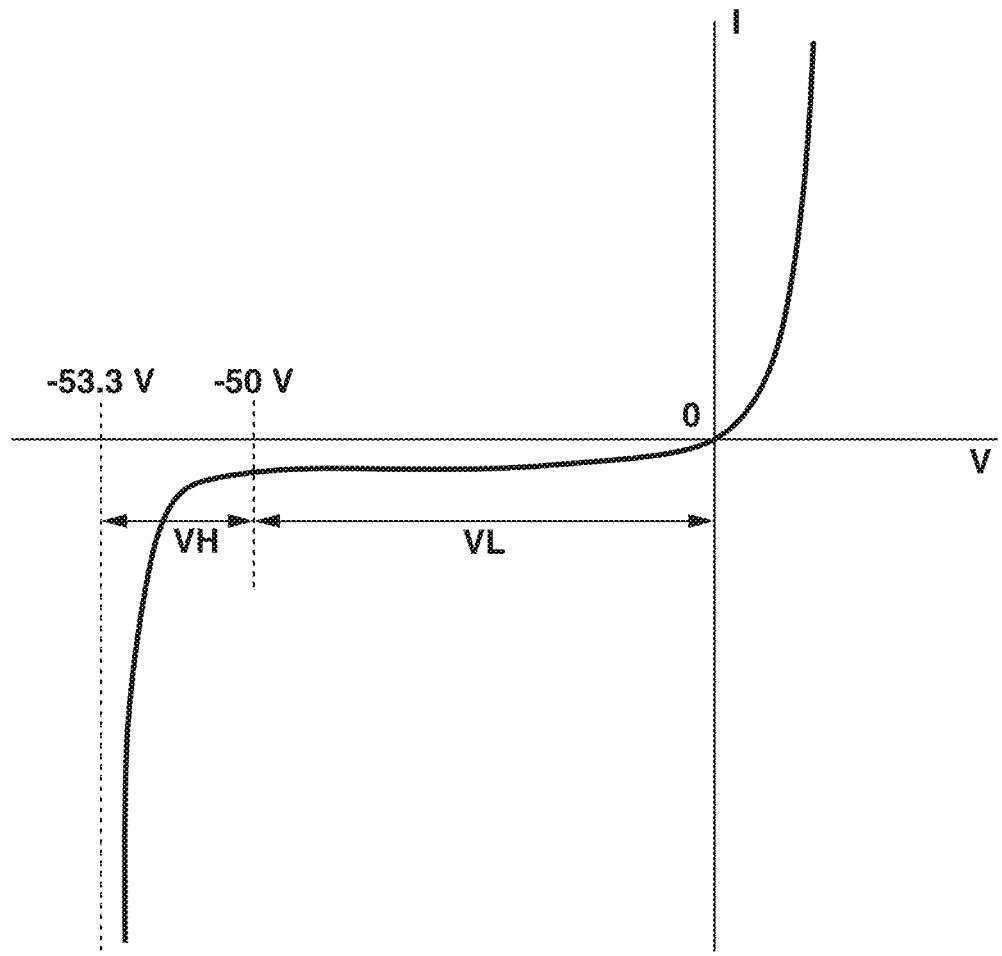
FIG. 4 is a graph illustrating an example of current-voltage characteristics of an APD.
Figure 5:
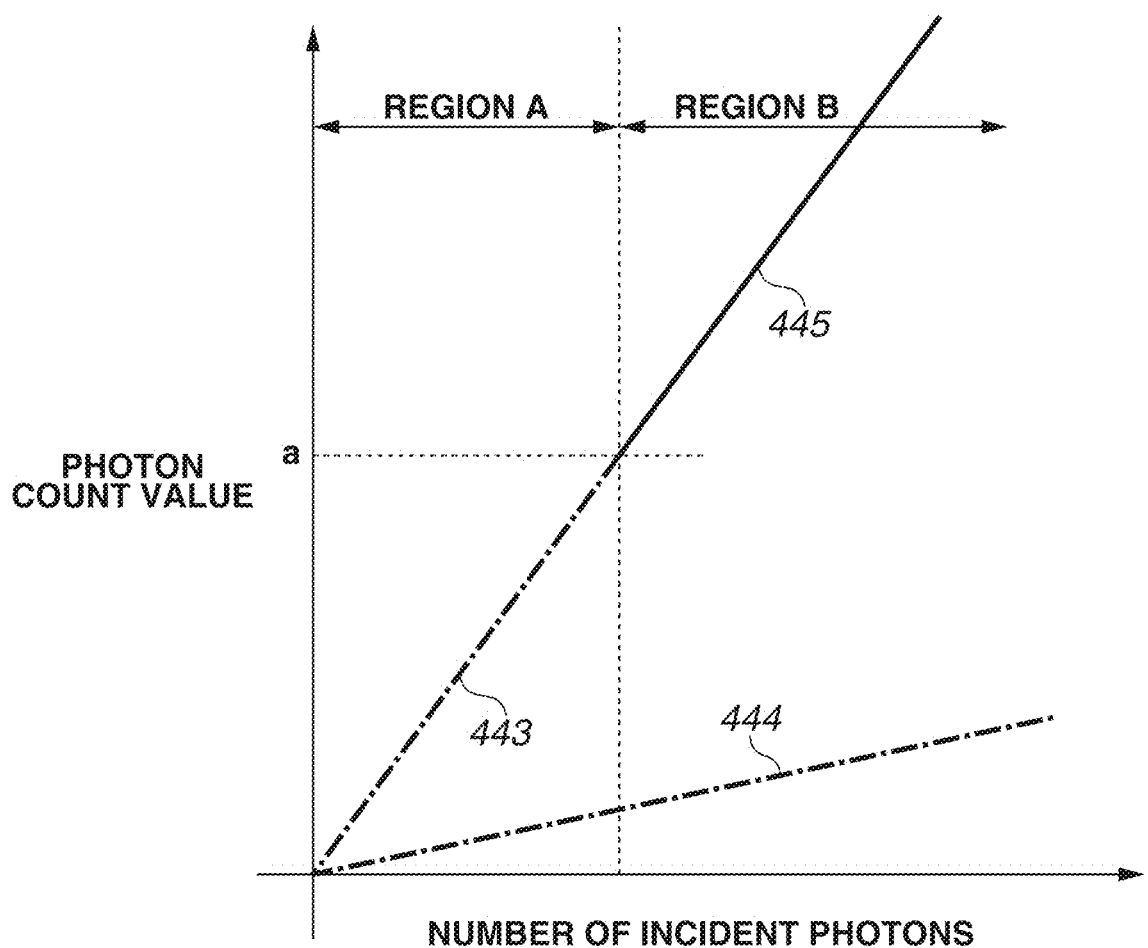
FIG. 5 is a graph illustrating a relationship between the number of incident photons and the number of counted photons.
Figure 6:
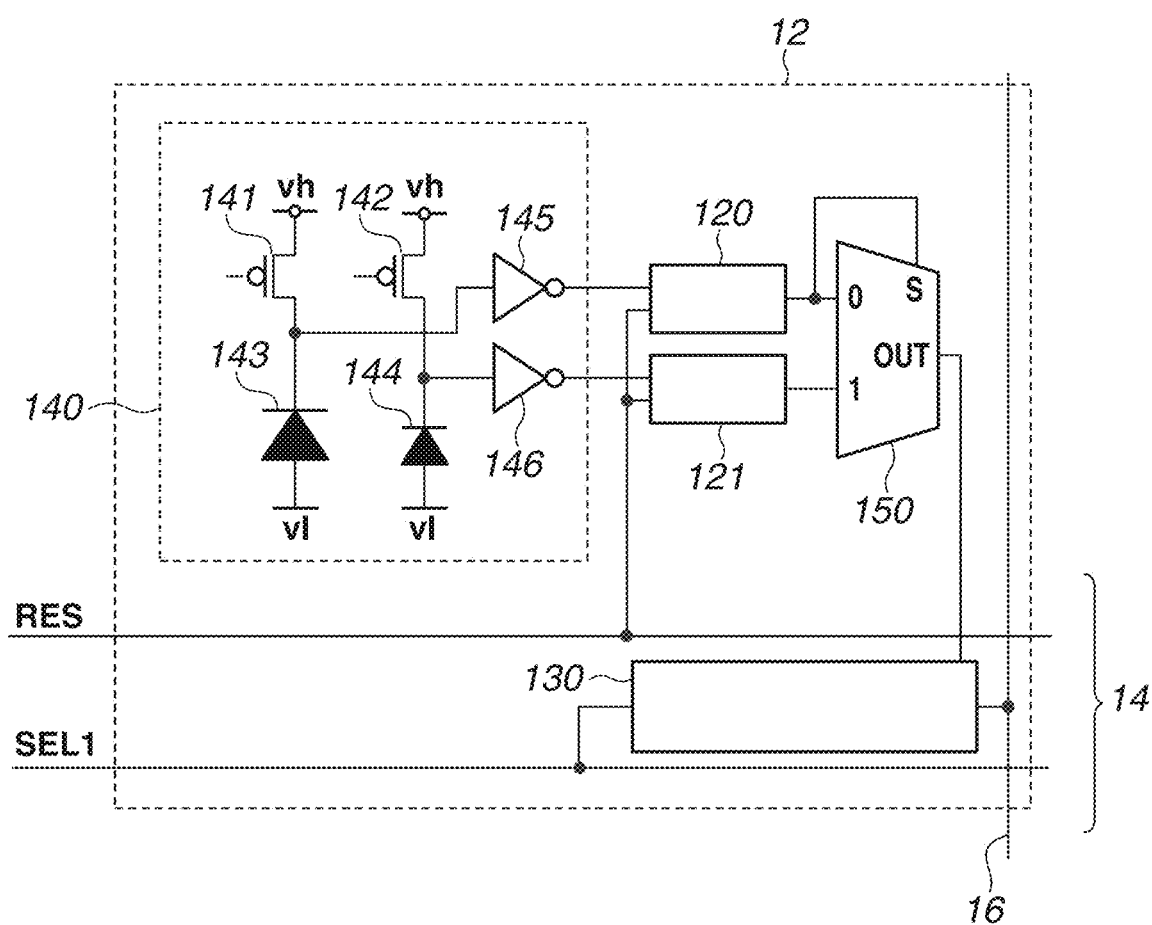
FIG. 6 is a circuit diagram illustrating another example configuration of a pixel circuit of the photoelectric conversion apparatus according to the first exemplary embodiment.
Figure 7:
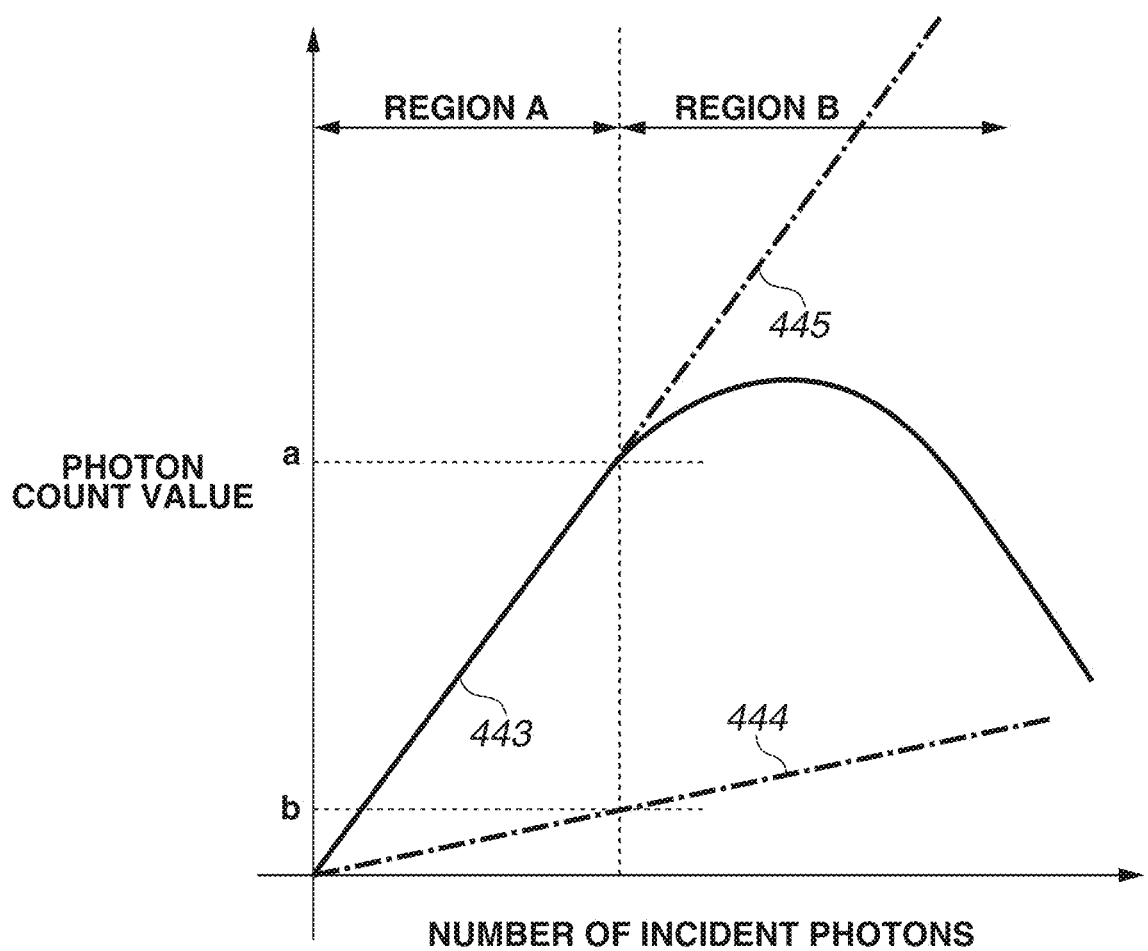
FIG. 7 is a graph illustrating another relationship between the number of incident photons and the number of counted photons.
Figure 8:
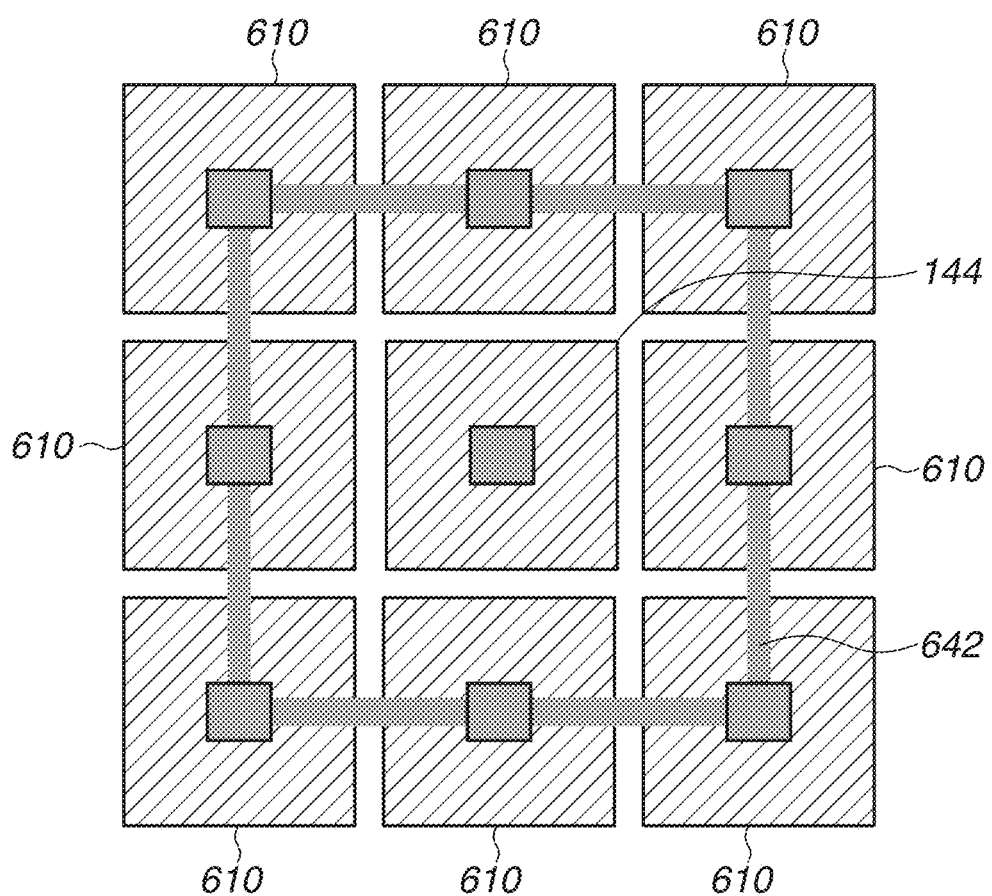
FIG. 8 is a plan view illustrating another example configuration of APDs of a pixel of the photoelectric conversion apparatus according to the first exemplary embodiment.

FIG. 1 is a schematic view illustrating the photoelectric conversion apparatus according to the first exemplary embodiment. FIG. 2 is a circuit diagram illustrating an example configuration of a pixel circuit of the photoelectric conversion apparatus according to the first exemplary embodiment. FIGS. 3A and 3B are a plan view and a cross-sectional view respectively illustrating an example configuration of avalanche photodiodes (APDs) of a pixel of the photoelectric conversion apparatus according to the first exemplary embodiment. FIG. 4 is a graph illustrating an example of current-voltage characteristics of an APD. FIG. 5 is a graph illustrating a relationship between the number of incident photons and the photon count value according to the first exemplary embodiment. FIG. 6 is a circuit diagram illustrating an example configuration of the pixel circuit of the photoelectric conversion apparatus according to the first exemplary embodiment. FIG. 7 is a graph illustrating a relationship between the number of incident photons and the photon count value according to the first exemplary embodiment. FIG. 8 is a plan view illustrating an example configuration of APDs of a pixel of the photoelectric conversion apparatus according to the first exemplary embodiment.

<Overall Configuration of Photoelectric Conversion Apparatus>

As illustrated in FIG. 1, an imaging apparatus 100 according to the present exemplary embodiment includes a pixel region 10, a vertical scanning circuit 20, a column readout circuit 30, a horizontal scanning circuit 40, a control circuit 50, and a signal processing circuit 60.

The pixel region 10 includes a plurality of the pixels 12 arranged in a matrix form over a plurality of rows and columns. Each row of the pixel array in the pixel region 10 is provided with control signal lines 14 that extend in the row direction (horizontal direction in FIG. 1). The control signal lines 14 connected to the pixels 12 arranged in the row direction serve as common signal lines for these pixels 12. Each column of the pixel array in the pixel region 10 is provided with a vertical output line 16 that extends in the column direction (vertical direction in FIG. 1). The vertical output line 16 connected to the pixels 12 arranged in the column direction serves as a common signal line for these pixels 12. Although, in FIG. 1, one vertical output line is drawn, a plurality of vertical output lines may be connected according to the number of bits of the output signal.

The number of pixels 12 included in the pixel region 10 is not particularly limited. For example, the pixel region 10 may be composed of the pixels 12 in several thousands of rows and several thousands of columns, like a general digital camera, or composed of a plurality of the pixels 12 arranged in one row or one column. Alternatively, the pixel region 10 may be composed of one pixel 12.

The control signal lines 14 for each row are connected to the vertical scanning circuit 20. The vertical scanning circuit 20 is a circuit unit that supplies a control signal for driving the readout circuit in the pixel 12 when pixel signals are read out from the pixel 12, to the pixel 12 via the control signal lines 14.

One end of the vertical output line 16 for each column is connected to the column readout circuit 30. The pixel signal read out from the pixel 12 is input to the column readout circuit 30 via the vertical output line 16. The column readout circuit 30 can include a memory for holding the pixel signal read out from the pixel 12.

The horizontal scanning circuit 40 is a circuit unit that supplies to the column readout circuit 30 a control signal for sequentially transferring the pixel signal held by the column readout circuit 30 to the output circuit 60 for each column. The control circuit 50 is a circuit unit that supplies a control signal for controlling operations and timings of the vertical scanning circuit 20, the column readout circuit 30, and the horizontal scanning circuit 40. The signal processing circuit 60 processes the pixel signal.

<Pixel Configuration>

The configuration and connection relationship of the pixel 12 according to the present exemplary embodiment will be described. FIG. 2 is a block diagram or an equivalent circuit illustrating the overall configuration of the pixel 12. As illustrated in FIG. 2, each pixel 12 includes a photoelectric conversion portion 140, counter circuits 120 and 121, and selection circuits 130 and 150.

The photoelectric conversion portion 140 includes avalanche photodiodes (hereinafter also referred to as APDs) 143 and 144. The anodes of the APDs 143 and 144 are connected to a power source that supplies a voltage VL. The cathodes of the APDs 143 and 144 are connected to the drains of p-type metal oxide semiconductor (MOS) transistors 141 and 142 and the input terminals of inverter circuits 145 and 146, respectively. The sources of the p-type MOS transistors 141 and 142 are connected to a power source that supplies a voltage VH having a higher potential than the voltage VL.

The output terminals of the inverter circuits 145 and 146 are output terminals of the photoelectric conversion portion 140. The output terminals of the inverter circuits 145 and 146 are connected to the counter circuits 120 and 121, respectively. The counter circuit 120 is connected to the 0 terminal of the selection circuit 150, the counter circuit 121 is connected to the 1 terminal of the selection circuit 150, and the OUT terminal of the selection circuit 150 is connected to the vertical output line 16 via the selection circuit 130.

The function of each element of a pixel will be described.

The photoelectric conversion portion 140 photoelectrically converts incident light to the APDs 143 and 144 and generated charges cause the avalanche multiplication. To achieve this, a voltage exceeding the reverse breakdown voltage is applied to each of the APDs 143 and 144. Since a quenching resistor (described below) is connected to each of the APDs 143 and 144, the cathode voltages of the APDs 143 and 144 change because of the occurrence of the avalanche multiplication.

In the example configuration illustrated in FIG. 2, the APD 143 has a larger area of the light receiving surface than the APD 144, and hence provides higher sensitivity to light than the APD 144. When a micro lens for leading the incident light to the light receiving surface is provided on the photoelectric conversion portion 140, one micro lens is disposed to cover both the APDs 143 and 144. Accordingly, when one micro lens is projected onto the light receiving surface, the projection of the micro lens at least partially overlaps with the light receiving surface of each of the APDs 143 and 144.

The p-type MOS transistors 141 and 142 function as quenching resistors when the APDs 143 and 144 are operated in the Geiger mode. With the existence of these resistors, the voltages of the cathodes of the APDs 143 and 144 temporarily change through the occurrence of the avalanche multiplication, and then return to the original voltages (typically the voltage VH). This is because a suitable impedance occurs between the power source node and the cathodes. When the quenching resistors are connected in this way, voltage change occurs the number of times corresponding to the number of incident photons.

Each of the inverter circuits 145 and 146 determines whether the signal output from the corresponding APD exceeds a threshold value, and outputs a signal that is the inversion of the magnitude relationship between the input signal and the threshold value. The input terminals of the inverter circuit 145 and 146 are connected to the cathodes of the APDs 143 and 144, respectively. The inverter circuit 145 and 146 output pulse waves that are shaped voltage variations of the cathodes of the APDs 143 and 144. In other words, the inverter circuits 145 and 146 have a waveform shaping function of shaping the continuous signal output from the corresponding APD in pulse form and then outputting the pulse wave. As described above, a voltage variation occurs at the cathodes of the APD 143 and 144 each time a photon is incident. Accordingly, each of the inverter circuits 145 and 146 outputs the number of pulse waves corresponding to the number of incident photons. As a result, photon counting is enabled.

Each of the counter circuits 120 and 121 counts the number of pulses output from the corresponding inverter circuit to count the number of photons incident on the corresponding APD. For example, a 3-bit counter circuit can count up to the third power of 2 in decimal number. For example, the counter circuit obtains a count value from 0 to 7. When the count value reaches the maximum value of a counter circuit, the counter circuit overflows and cannot obtain the count value exceeding its maximum value. Since the counter circuit restarts counting from the initial value or an indefinite value, the obtained count value does not coincide with the actual number of incident photons. When the counter circuit is reset, the counter circuit restarts counting from the initial value.

When the level of the S terminal of the selection circuit 150 is Lo (e.g., logical LOW), the selection circuit 150 outputs the output of the 0 terminal from the OUT terminal. When the level of the S terminal is Hi (e.g., logical HIGH), the selection circuit 150 outputs the output of the 1 terminal from the OUT terminal. The output of the high-sensitivity APD 143 is connected to the 0 terminal of the selection circuit 150 via the inverter circuit 145. The output of the low-sensitivity APD 144 is connected to the 1 terminal of the selection circuit 150 via the inverter circuit 146. SEL2 is connected to the S terminal of the selection circuit 150. When the count value exceeds a predetermined threshold value, SEL2 is changed from Lo to Hi by the control circuit 50. The output of the selection circuit 150 is input to the selection circuit 130. In other words, the count value of either the counter circuit 120 or 121 is selected by the selection circuit 150 and input to the selection circuit 130.

The selection circuit 130 is connected to the vertical scanning circuit 20 via the control signal lines 14. Upon receiving a control signal (SEL1) supplied from control circuit 50, the selection circuit 130 selects the readout of the count value of the counter circuit 120 or 121 to the vertical output line 16. The selected signal is output to the vertical output line 16 as the signal of the pixel to be read out from among the plurality of the pixels 12 in the pixel region 10.

The control signal lines 14 include a reset signal line RES and selection signal lines SEL1 and SEL2. The reset signal line RES is connected to the counter circuits 120 and 121 of the pixel 12 belonging to the corresponding row, and supplies a reset signal for resetting the count of the counter circuits 120 and 121. The selection signal line SEL1 is connected to the selection circuit 130 of the pixel 12 belonging to the corresponding row, and supplies to the selection circuit 130 a signal for controlling signal readout from each pixel to the vertical output line 16. The selection signal line SEL2 is connected to the S terminal of the selection circuit 150 of the pixel 12 belonging to the corresponding row, and supplies to the selection circuit 150 a signal for selecting the output of the 0 terminal or the output of the 1 terminal as the signal to be output from the OUT terminal of the selection circuit 150.

The structure of the APDs 143 and 144 will be described with reference to FIGS. 3A and 3B. The imaging apparatus according to the present exemplary embodiment can be configured, for example, by laminating a first substrate provided with the APDs 143 and 144 and a second substrate provided with other components. Other components may include the vertical scanning circuit 20, the column readout circuit 30, the horizontal scanning circuit 40, the control circuit 50, the signal processing circuit 60, and other peripheral circuits in addition to the components of the pixel 12 other than the APDs 143 and 144. FIG. 3B schematically illustrates the cross-section taken along line T-T' in FIG. 3A on the substrate provided with APDs out of the two substrates. The imaging apparatus according to the present exemplary embodiment is not limited to the configuration illustrated in FIG. 3B. For example, a layered structure in which a part of the pixel 12 is disposed on the first substrate and the other part on the second substrate, is also applicable.

The APDs 143 and 144 of each pixel 12 are formed on a semiconductor substrate 210. The semiconductor substrate 210 is, for example, an n-type silicon substrate, and includes a first surface 212 and a second surface 214 facing the first surface 212. For example, the first surface 212 is the front surface of the semiconductor substrate 210, and the second surface 214 is the rear surface of the semiconductor substrate 210.

The semiconductor substrate 210 is provided with an n-type semiconductor region 224. The n-type semiconductor region 224 is partitioned for each region corresponding to one pixel 12 by a separation region 220 composed of a p-type semiconductor region. The separation region 220 is disposed to surround each n-type semiconductor region 224 in a planar view. The side of the second surface 214 of the p-type semiconductor region 220 contacts a p-type semiconductor region 222 provided in contact with the second surface 214 of the semiconductor substrate 210.

Of the p-type and the n-type semiconductor regions configuring the APDs 143 and 144 included in one pixel 12, the n-type semiconductor region includes the separation region 220 and the p-type semiconductor region 222. The n-type semiconductor region includes one n-type semiconductor region 224 partitioned by the separation region 220, and n-type semiconductor regions 226 and 228 disposed in the n-type semiconductor region 224.

Although, in this example, the n-type semiconductor region 224 where a plurality of APDs for each pixel 12 is disposed is separated by a pn junction, the n-type semiconductor region 224 may be separated by other element separation methods. Examples of other element separation methods include the Shallow Trench Isolation (STI) method, the Deep Trench Isolation (DTI) method, and the LOCal Oxidation of Silicon (LOCOS) method.

Each n-type semiconductor region 224 partitioned by the separation region 220 configures a plurality of the APDs 143 and 144 included in one pixel 12. Referring to FIG. 3A, the white space for separating the APDs 143 and 144 disposed in the n-type semiconductor region 224 corresponds to a p-type semiconductor region 230 illustrated in FIG. 3B.

The APD 143 has the cathode as the outer periphery of the n-type semiconductor region 224 and the anode as the p-type semiconductor regions 220 and 222 in contact with the n-type semiconductor region 224. The n-type semiconductor region 226 is a part of the cathode of the APD 143. The APD 144 has the cathode as the center of the n-type semiconductor region 224 and the anode as the p-type semiconductor regions 220 and 222. The n-type semiconductor region 228 is a part of the cathode of the APD 144. The n-type semiconductor regions 226 and 228 are disposed in contact with the first surface 212 of the semiconductor substrate 210. The APDs 143 and 144 are separated from the elements outside the pixel 12 by the p-type semiconductor region 220. The APDs 143 and 144 include the p-type semiconductor regions 220 and 222 as a common anode. The cathodes of the APD 143 and 144 are electrically separated by the p-type semiconductor region 230. The p-type semiconductor region 230 is disposed between the n-type semiconductor regions 228 and 226 of the adjacent APD, in contact with the first surface 212 of the semiconductor substrate 210.

An insulating film 234 is disposed on the first surface 212 of the semiconductor substrate 210 on which the APDs 143 and 144 are provided. On the insulating film 234, wirings 238 and 242 are provided. The wiring 238 is connected to the p-type semiconductor region 220 via a contact plug 236. The wiring 242 is connected to the n-type semiconductor regions 226 and 228 via contact plugs 240.

The p-type semiconductor region 220 as the anode is supplied with a voltage VL via the wiring 238 and the contact plug 236. The n-type semiconductor regions 226 and 228 as the cathode are connected to the inverter circuits 145 and 146, respectively, illustrated in FIG. 2 via the contact plug 240 and the wiring 242.

Referring to the APD 143, for example, since a reverse bias voltage is applied between the p-type semiconductor region 220 and the n-type semiconductor region 226, a depletion layer is formed on the pn junction surface between the p-type semiconductor regions 220 and 222 and the n-type semiconductor region 224. When light is incident from the second surface 214 of the p-type semiconductor region 222, pairs of an electron and a hole are formed in the semiconductor region of the incident portion. Generated electrons are accelerated by the electric field from the p-type semiconductor 222 to the n-type semiconductor region 226, and the avalanche multiplication occurs.

The impurity density of the n-type semiconductor region 226 is higher than the impurity density of the n-type semiconductor region 224. Further, a potential barrier is formed around the n-type semiconductor region 226 by the p-type semiconductor region 230. Charges generated by the avalanche multiplication are gathered in the n-type semiconductor region 226 corresponding to the position where charges are generated.

The avalanche multiplication also occurs in the APD 144. Charges generated by the avalanche multiplication are gathered in the n-type semiconductor region 228. Sufficiently increasing the impurity density of the n-type semiconductor regions 226 and 228 makes it possible to gradually form a potential valley from the pn junction where the avalanche multiplication occurs, and gather charges in the n-type semiconductor regions 226 and 228.

The impurity density of the p-type semiconductor regions 220 and 222 is higher than the impurity density of the p-type semiconductor region 230, and forms an electric field that is sufficient to cause the avalanche multiplication between the n-type semiconductor 224 and the p-type semiconductor regions 220 and 222. The semiconductor substrate 210 may be a p-type silicon substrate and the n-type semiconductor 224 in FIGS. 3A and 3B may be a p-type semiconductor region 224a having a lower impurity density than the p-type semiconductor regions 220 and 222. In this case, the avalanche multiplication occurs by the electric field formed between the p-type semiconductor region 224a and the n-type semiconductor region 226. The field intensity can be increased by replacing the n-type semiconductor region 224 with the p-type semiconductor region 224a having a lower density than the separation region 220. As a result, the avalanche multiplication with a lower voltage is enabled. In such a configuration, noise can be effectively reduced by providing a guard region that prevents the concentrated occurrence of the avalanche multiplication at the end of the n-type semiconductor region 226.

In the example configuration of a pixel illustrated in FIGS. 3A and 3B, the APD 143 having a small area and low sensitivity out of the APDs included in one pixel 12 is disposed at the center, and the APD 144 having a large area and high sensitivity is disposed in the outer periphery. However, an example configuration of a pixel is not limited thereto.

As other example configurations, the light collection efficiency of the micro lens disposed on the pixel may be utilized. A similar effect can be obtained by disposing an APD under the center of the micro lens as a high-sensitivity APD and disposing an APD under the outer periphery of the micro lens as a low-sensitivity APD.

<Driving Method>

Next, a method for driving the imaging apparatus according to the present exemplary embodiment will be described.

If the voltages VH and VL are set so as to be able to apply a reverse bias voltage sufficient to enable the Geiger mode operation to the APDs 143 and 144. Assume an example case where an APD has a current-voltage characteristics as illustrated in FIG. 4. The reverse breakdown voltage (hereinafter also simply referred to as a breakdown voltage) of the APD illustrated in FIG. 4 is a value between −50V and −53.3V. In other words, even when a reverse bias voltage up to around −50V is applied to the APD, the avalanche multiplication does not occur. However, when a larger reverse bias voltage is applied to the APD, the avalanche multiplication occurs. In addition, when a reverse bias voltage around 53.3V or larger is applied to the APD, the APD operates in what is called the Geiger mode in which the gain of the avalanche multiplication is very high.

According to the present exemplary embodiment, the APD is used as a single photon avalanche photodiode (SPAD) that operates in the Geiger mode. For this reason, for example, −50V is applied to the anode of the APD as the voltage VL, and +3.3V is applied to the source of the p-type MOS transistor as the voltage VH. As a result, a reverse bias voltage of approximately 53.3V is applied to each of the APDs 143 and 144.

The gates of the p-type MOS transistors 141 and 142 as quenching resistors are applied with the same voltage as the voltage applied to the sources thereof. Thus, the p-type MOS transistors 141 and 142 operate as resistive elements with which the resistance value is determined by the transistor size. By setting the voltage applied to the gates of the p-type MOS transistors 141 and 142 to be lower than the voltage applied to the sources thereof, the two transistors can also be used as resistive elements having a larger resistance value. The gate voltages of the p-type MOS transistors 141 and 142 can be suitably set to obtain desired quenching resistors.

The APD is applied with a reverse bias voltage of 53.3V, which is the potential difference between the voltages VH and VL. This reverse bias voltage is higher than the breakdown voltage and is sufficient to cause the avalanche multiplication. However, in a state where there is no seed carrier, the avalanche multiplication does not occur and no current flows in the APD.

In this state, when photons are incident from the side of the second surface 214 of the semiconductor substrate 210, photons are absorbed by the n-type semiconductor region 224, and pairs of an electron and a hole are generated. Of these carriers, holes are discharged via the p-type semiconductor regions 220, 222, and 230. On the other hand, electrons are accelerated by the electric field of the n-type semiconductor region 226 or 228 to cause the avalanche multiplication, and the APD operates in the Geiger mode.

Focusing on the actions of the carriers, when the avalanche multiplication occurs and a large current flows in the APD, the potential of the node as the terminal on the cathode side of the APD decreases and the avalanche multiplication stops. The carriers of the terminal on the cathode side are discharged via the p-type MOS transistors 141 and 142 connected as loads, and the terminal on the cathode side returns to the initial voltage again (quenching operation).

In this way, with the incidence of photons, the potential of the cathode of the APD changes from a carrier stand-by state to a state where a large current flows to cause a voltage drop in the Geiger mode, and then enters the carrier stand-by state again. The inverter circuits 145 and 146 shape this voltage waveform to generate signal pulses starting from the time when one photon arrives. Counting the number of these signal pulses enables performing what is called photon counting.

The APDs 143 and 144 are capable of independently detecting photons. The inverter circuit 145 and 146 respectively output signal pulses. The outputs of the inverter circuits 145 and 146 are output to the counter circuits 120 and 121, respectively. Thus, the counter circuit 120 counts the total number of photons detected by the APD 143, and the counter circuit 121 counts the total number of photons detected by the APD 144.

Either one of the count values counted by the counter circuits 120 and 121 is selected by the selection circuit 150. Then, the selected count value is output to the vertical output line 16 by the operation of the selection circuit 130 according to the selection signal from the vertical scanning circuit 20.

<First Variation>

An example operation according to the first exemplary embodiment will be described with reference to FIG. 5.

Referring to FIG. 5, the horizontal axis indicates the number of incident photons in unit time and unit area, and the vertical axis indicates the photon count value counted for each APD. Referring to FIG. 5, a plot 443 indicates the photon count value corresponding to the APD 143 in FIG. 2, and a plot 444 indicates the photon count value corresponding to the APD 144 in FIG. 2. A plot 445 indicates a relationship between the number of incident photons in unit area after image processing, and the photon count value after calculation processing according to the present exemplary embodiment, with the values plotted in logarithmic scale on both axes.

As described above, the APD 143 has a larger light receiving area than the APD 144. Therefore, when an equal light quantity is incident in unit time and unit area, the amount of charges generated by the APD 143 is larger than the amount of charges generated by the APD 144. In other words, the APD 143 is more sensitive to light than the APD 144 is, and accordingly the inclination of the plot 443 is larger than the inclination of the plot 444.

According to the present exemplary embodiment, for example, the sensitivity ratio between the APDs 143 and 144 is n. This means that the count value corresponding to the APD 143 is n times the count value corresponding to the APD 144 in a state where an equal light quantity is incident.

Assume a case where the photoelectric conversion apparatus according to the present exemplary embodiment is used in a light quantity environment where photon counting can be accurately performed by the APD, or a case where the photoelectric conversion apparatus includes high-performance APDs capable of instantly performing the quenching operation. In such cases, the count values of the counter circuits 120 and 121 change upon incidence of photons on the APDs of each pixel. However, the counter circuits 120 and 121 may be saturated depending on the light quantity and exposure time.

The present exemplary embodiment changes the count value to be used according to the photon amount to be counted or the count value to be output from the pixel 12, based on the count value 443 of the APD 143.

When light is incident on the APDs 143 and 144, the avalanche multiplication occurs in each APD, and each of the counter circuits 120 and 121 performs pulse counting. The count value output from each counter circuit is input to the selection circuit 150.

The control signal supplied from the control circuit 50 is input to the S terminal of the selection circuit 150 via the vertical scanning circuit 20 and SEL2. When the level of the S terminal is Lo, the selection circuit 150 outputs the input of the 0 terminal from the OUT terminal. In other words, the selection circuit 150 outputs the photon count value 443 of the APD 143 counted by the counter circuit 120.

When the output count value 443 of the APD 143 exceeds a predetermined threshold value a, SEL2 is changed from Lo to Hi by the control circuit 50. When the level of the S terminal is Hi, the selection circuit 150 outputs the input of the 1 terminal from the OUT terminal. In other words, the selection circuit 150 outputs the photon count value 444 of the APD 144 counted by the counter circuit 121.

The OUT terminal of the selection circuit 150 is input to the selection circuit 130. The output of the selection circuit 130 is read out to the vertical readout circuit 16 by the control signal supplied from SEL1. The read count values 443 and 444 are subjected to calculation processing by the signal processing circuit 60. More specifically, when the count value 443 does not exceed the threshold value a (when the incident light quantity is in the range of a region A), the count value 443 is used as the number of photons. On the other hand, when the count value 443 exceeds the threshold value a (when the incident light quantity is in the range of a region B), the linearity of the photon count value is maintained by determining obtained as a result of multiplying the count value 444 by n to be the number of photons. The threshold value a is, for example, the maximum value countable by the counter circuit 120. However, an arbitrary value countable by the counter circuit 120 can be used as the threshold value a. It is desirable that the multiplier for the count value 444 is a value corresponding to the sensitivity ratio between the APDs 143 and 144. However, it is not necessary to use an accurate sensitivity ratio, and a calculation such as addition of a constant may be performed instead of multiplication.

In an environment where incident light is so intense that the count value 443 of the high-sensitivity APD 143 exceeds the threshold value a, the counter circuit 120 may be saturated. Accordingly, the count value 444 corresponding to the low-sensitivity APD 144 is used as a signal to be used for image formation. Since the low-sensitivity APD 144 has a low frequency of pulse generation, the counter circuit 121 corresponding to the APD 144 is unlikely to be saturated. For this reason, by selecting the counter circuit 121, photon counting can be continued even under an environment where the counter circuit 120 corresponding to a high-sensitivity pixel is saturated. On the other hand, when intense light as described above is not incident, the use of the high-sensitivity APD 143 enables obtaining a signal having a high signal-to-noise (S/N) ratio even in the dark time.

The present exemplary embodiment changes the APD to be used for image formation based on the count value as a threshold value in this way, and changes correction processing by multiplying the count value depending on the sensitivity ratio between the APDs 143 and 144. This prevents the counter circuits 120 and 121 from being saturated and achieves signal output while maintaining the linearity in both the region A where the count value 443 corresponding to the APD 143 is used and the region B where the count value 444 corresponding to the APD 144 is used. In other words, the dynamic range can be expanded.

In the above descriptions, either one of the count values 443 and 444 selected by the selection circuit 150 is read out from the pixel 12. However, both the count values 443 and 444 may be read out from the pixel 12. Then, the count value 443 and the threshold value a only needs to be compared to select the signal to be used for image formation. The comparison and selection in this case may be performed by the imaging apparatus or a signal processing apparatus outside the imaging apparatus.

Although, in the present exemplary embodiment, the control signal SEL2 is input to the S terminal of the selection circuit 150, a part of the output of the counter circuit 120 may be input to the S terminal of the selection circuit 150, as illustrated in FIG. 6. In this case, the avalanche multiplication occurs in each of the APDs 143 and 144. The counter circuits 120 and 121 perform pulse counting, and the count value output from each counter circuit is input to the selection circuit 150.

A part of the output of the counter circuit 120 is input to the S terminal of the selection circuit 150. When the level of the S terminal is Lo, the selection circuit 150 outputs the input of the 0 terminal from the OUT terminal. In other words, the selection circuit 150 outputs the photon count value 443 of the APD 143 counted by the counter circuit 120.

When the output of the counter circuit 120 exceeds the predetermined threshold value a, and the input of the S terminal changes from Lo to Hi, the selection circuit 150 outputs the input of the 1 terminal from the OUT terminal. In other words, the selection circuit 150 outputs the photon count value 444 of the APD 144 counted by the counter circuit 121.

The subsequent readout and calculation processing is similar to those according to the above-described exemplary embodiment.

The exemplary embodiment using such a circuit enables reducing the number of control signals required in one exposure in comparison with the above-described exemplary embodiment, further simplifying signal processing. With the simplification of signal processing, the reduction of power consumption can also be expected.

<Second Variation>

Another example operation according to the present exemplary embodiment will be described. In the above-described example operation, the overflow of the counter circuit 120 is an issue. In this example operation, a pileup phenomenon in the APD 143 is an issue. In this example operation, the count value to be used is changed depending on the photon amount to be counted based on the count value 444 of the APD 144. The photon count operation in this example operation will be described in more detail with reference to FIG. 7.

The vertical and horizontal axes of the graph in FIG. 7 are the same as those in FIG. 5. More specifically, in FIG. 7, the horizontal axis indicates the number of incident photons in unit time and unit area, and the vertical axis indicates the photon count values counted by the counter circuits 120 and 121. The count values 443 and 444 in FIG. 7 indicate the photon count values corresponding to the APDs 143 and 144 in FIG. 2, respectively. A plot 445 indicates the relationship between the number of incident photons in unit area and the photon count value after calculation processing according to the present exemplary embodiment, with the values plotted in logarithmic scale on both axes.

When a small number of photons are incident, as illustrated in the region A in FIG. 7, the high linearity can be obtained between the number of incident photons of the APDs 143 and 144 and the count values of the counter circuits 120 and 121.

However, when a large number of photons are incident (region B), the photon count value by the counter circuit 120 may be smaller than the actual number of incident photons. When light is extremely intense and a remarkably large number of photons are incident, photon counting cannot be performed by the counter circuit 120, and the photon count value may become approximately zero.

The APD 144 has lower sensitivity than the APD 143, as described above. Accordingly, when intense light that disables photon counting by the counter circuit 120 is incident, the counter circuit 121 can perform photon counting.

Thus, when the number of incident photons is within the range of the region A in FIG. 7, the outputs of both the APDs 144 and 143 can maintain the linearity, enabling high-sensitivity light detection by the APD 143. On the other hand, when the number of incident photons is within the range of the region B in FIG. 7, the output of the APD 143 may decrease in linearity. On the other hand, the output of the APD 144 can maintain the linearity.

The cause for such a phenomenon will be described. In the region A where a comparatively small number of photons are incident, the probability that the timings of photon detection in both the APDs 143 and 144 overlap is very low. In the inverter circuits 145 and 146, after the signal pulse rises, it falls before the following photon comes. This makes it possible to output the number of signal pulses equivalent to the number of photons incident on the APD.

On the other hand, in the region B where a large number of photons are incident, there is a high probability that a photon is incident again on the APD 143 after the signal pulse rises and before it falls in the inverter circuit 145. When new photons are incident, the avalanche current increases. As a result, the voltage of the cathode of the APD 143, i.e., the voltage of the input node of the inverter circuit 145 becomes hard to return. This causes a pileup phenomenon that a plurality of signal pulses is concatenated, and new incident photons may not be counted. Further, a remarkably large number of photons are incident, the output of the inverter circuit 145 is set to the Hi level and remains unchanged. As a result, the counter circuit 120 cannot count signal pulses, possibly resulting in that the photon count value becomes zero.

Thus, in photon counting, the frequency of detectable photon arrival, i.e., the light intensity, is determined by the time period from when one photon is detected until the following photon becomes detectable (this time period is referred to as a "dead time"). The length of the dead time depends on the impedance of the quenching resistors (p-type MOS transistors 141 and 142) and the parasitic capacitances of the cathodes of the APDs 143 and 144.

To implement a super high-sensitivity imaging apparatus capable of detecting photons even in a very dark situation, such as under the moonlight and starlight, the pixel 12 having a large size to a certain extent may be considered. However, in a bright situation, for example, under light in the daytime, the imaging apparatus configured in this way provides an excessively high frequency of photon detection even with a light quantity reduced by a diaphragm mechanism, thus disabling photon counting.

The APD 144 has a smaller area and lower sensitivity than the APD 143. Thus, in a situation where light in the range of the region A is incident, the count value 443 of the APD 143 indicates a small count value. Even in a state where light in the range of the region B is incident and the count value corresponding to the APD 143 decreases, the photon count value of the APD 144 linearly increases with respect to the number of incident photons if the frequency of photons incident on the APD 144 does not overlap the dead time.

According to the present exemplary embodiment, for example, the sensitivity ratio between the APDs 143 and 144 is n. The count value corresponding to the APD 143 is n times the count value corresponding to the APD 144 under an equal light quantity in the region A.

Like the above-described first variation, when light is incident on the APDs 143 and 144, the avalanche multiplication occurs in each APD, and the counter circuits 120 and 121 perform pulse counting. The count value output from each counter circuit is input to the selection circuit 150.

The control signal supplied from the control circuit 50 via the vertical scanning circuit 20 is input from SEL2 to the S terminal of the selection circuit 150. When the level of the S terminal is Hi, the selection circuit 150 outputs the input of the 1 terminal, i.e., the photon count value 444 of the APD 144 counted by the counter circuit 121, from the OUT terminal.

When the count value 444 of the output APD 144 is smaller than a predetermined threshold value b, the level of SEL2 is changed from Hi to Lo by the control circuit 50. When the level of the S terminal is Lo, the selection circuit 150 outputs the input of the 0 terminal, i.e., the photon count value 443 of the APD 143 counted by the counter circuit 120, from the OUT terminal.

The OUT terminal of the selection circuit 150 is input to the selection circuit 130. The selection circuit 130 is read out to the vertical readout circuit 16 by the control signal supplied from SEL1. The read count values 443 and 444 are subjected to the calculation processing by the signal processing circuit 60. More specifically, when the count value 444 is smaller than the threshold value b (when the incident light quantity is in the range of the region A), the count value 443 is used as the number of photons. On the other hand, when the count value 444 is larger than the threshold value b (when the incident light quantity is in the range of the region B), the linearity of the photon count value can be maintained by determining a result of multiplying the count value 444 by n to be the number of photons. The threshold value b is obtained by dividing the maximum countable value of the counter circuit 120 by n. Desirably, the value obtained by dividing by n the count value of the count circuit 120 in a range where the above-described pileup phenomenon does not occur is used as the threshold value b.

In the above-described environment where intense light is incident, the count value 443 of the APD 143 may indicate a value smaller than the actual number of incident photons. Therefore, an accurate signal corresponding to the number of incident photons may not be obtained.

According to the present exemplary embodiment, then, in an environment where weak light is incident and the count value 444 of the APD 144 is smaller than or equal to the threshold value b, the signal to be used corresponds to the APD 143 that is more sensitive and enables obtaining a signal having a favorable S/N ratio. On the other hand, in an environment where intense light is incident and the count value 444 of the APD 144 is larger than or equal to the threshold value b, the signal to be used corresponds to the APD 144 that enables signal output while maintaining the linearity even when intense light is incident.

The present exemplary embodiment changes the APD to be used for image formation based on the count value as a threshold value in this way, and changes correction processing such as multiplying the count value depending on the sensitivity ratio between the APDs 143 and 144. This prevents the occurrence of the dead time and achieves signal output while maintaining the linearity in both the region A where the count value 443 corresponding to the APD 143 is used and the region B where the count value 444 corresponding to the APD 144 is used.

The timing for comparing the count value 444 with the threshold value b is not particularly limited. For example, as described above, the count value 444 may be firstly read after completion of the exposure period, and then the read count value 444 and the threshold value b may be compared. Processing for reading the count value 443 or processing for not reading it may be selected based on the result of the comparison. Alternatively, the count value 444 and the threshold value b may be compared during the exposure period when a predetermined time period has elapsed since the start of exposure. In this case, processing for reading the count value 443 or processing for reading the count value 444 can be selected based on the result of the comparison.

Although, in the present exemplary embodiment, the control signal of SEL2 is input to the S terminal of the selection circuit 150, the circuit may also be configured without using SEL2, like the first variation. In this case, a part of the output of the counter circuit 121, instead of the counter circuit 120 in FIG. 6, may be input to the S terminal of the selection circuit 150.

FIG. 8 is a plan view schematically illustrating an example configuration of an APD of a pixel of the photoelectric conversion apparatus according to the present exemplary embodiment. Referring to FIG. 8, the cathodes (n-type semiconductor regions) of APDs 610 are disposed in a state of being separated from each other on the semiconductor substrate, and electrically connected via wirings 642. By connecting the eight APDs 610 in this way, one APD equivalent to the APD 143 in FIGS. 3A and 3B is formed.

In other words, in the example configuration illustrated in FIG. 8, the n-type semiconductor region 226 formed as a ring surrounding the APD 144 (FIGS. 3A and 3B) is partitioned into eight portions, and the eight n-type semiconductor regions 226 are separated from each other by the separation region (p-type semiconductor region) or other element separation methods.

A relatively high sensitive photodiode may be formed by connecting a plurality of APDs in this way.

The APDs illustrated in FIGS. 3A and 3B, and FIG. 8 are to be considered as examples. The APD structures applicable to the present exemplary embodiment are not limited to the planar and cross-sectional structures illustrated in FIGS. 3A and 3B, and FIG. 8.

A second exemplary embodiment will be described with reference to FIGS. 9 and 10.

According to the present exemplary embodiment, photon count processing can be simplified by changing the signal to be input to the counter circuit based on a threshold count value as a boundary value.

Figure 9:
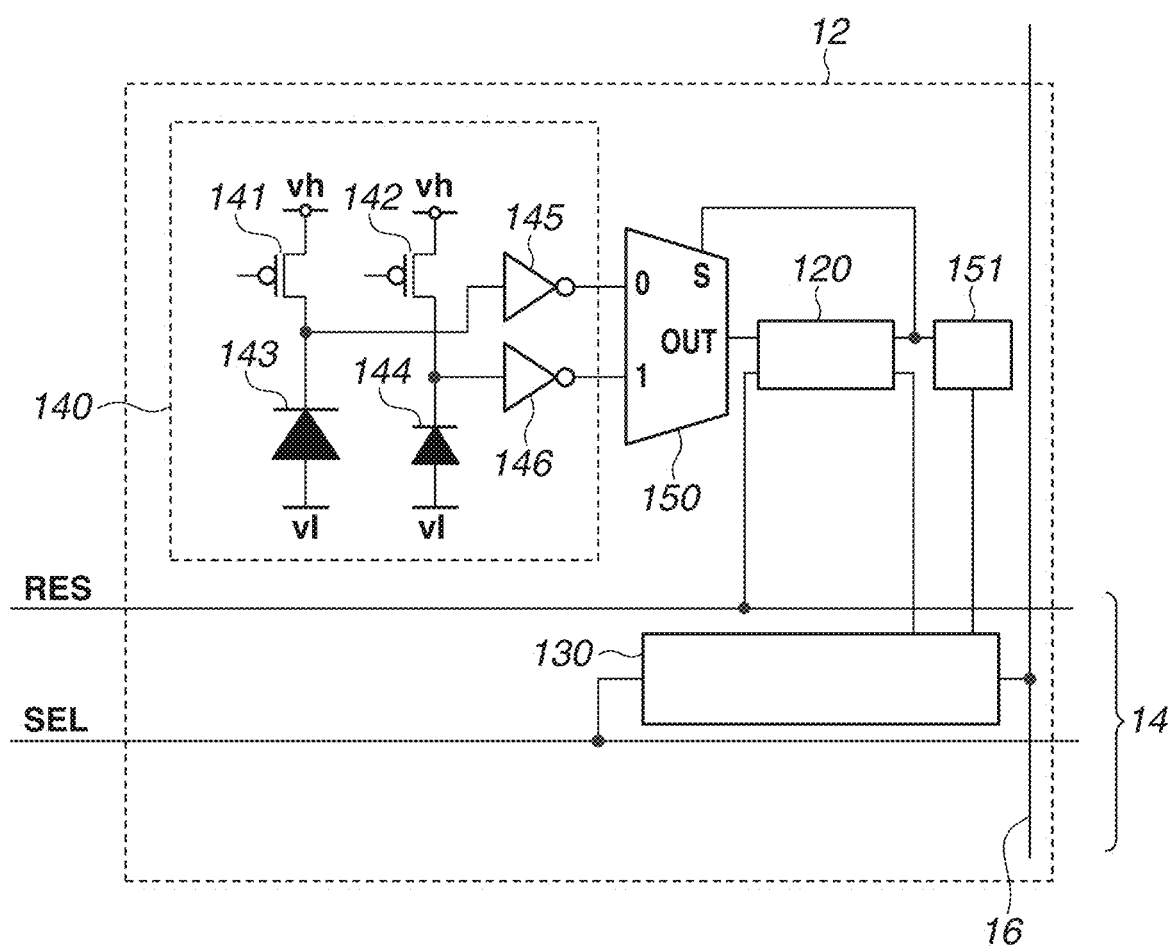
FIG. 9 is a circuit diagram illustrating an example configuration of a pixel circuit of a photoelectric conversion apparatus according to a second exemplary embodiment.

FIG. 9 illustrates an example configuration of a pixel circuit of a photoelectric conversion apparatus according to the present exemplary embodiment.

Elements in FIG. 9 identical to those in FIG. 2 are assigned the same reference numerals as those in FIG. 2, and redundant descriptions thereof will be omitted. Differences from the first exemplary embodiment will be mainly described.

As illustrated in FIG. 9, each pixel 12 includes a photoelectric conversion portion 140, a counter circuit 120, selection circuits 130 and 150, and a saturation sensor circuit 151.

When the level of the terminal S is Lo, the selection circuit 150 outputs the input of the 0 terminal from the OUT terminal. When the level of the terminal S is Hi, the selection circuit 150 outputs the input of the 1 terminal from the OUT terminal.

The output of the high-sensitivity APD 143 is connected to the 0 terminal of the selection circuit 150 via the inverter circuit 145. The output of the low-sensitivity APD 144 is connected to the 1 terminal of the selection circuit 150 via the inverter circuit 146. The output of the selection circuit 150 is input to the counter circuit 120. The saturation sensor circuit 151 is connected to the S terminal of the selection circuit 150. When the count value of the counter circuit 120 input to the saturation sensor circuit 151 exceeds a predetermined threshold value, the output of the saturation detection circuit 151 changes from Lo to Hi.

The saturation sensor circuit 151 holds the levels of the Lo or Hi signal as a part of the output of the counter circuit 120. The saturation sensor circuit 151 is connected to the selection circuit 130, and the level of the held signal is read out to the vertical output line 16 together with the count result.

Figure 10:
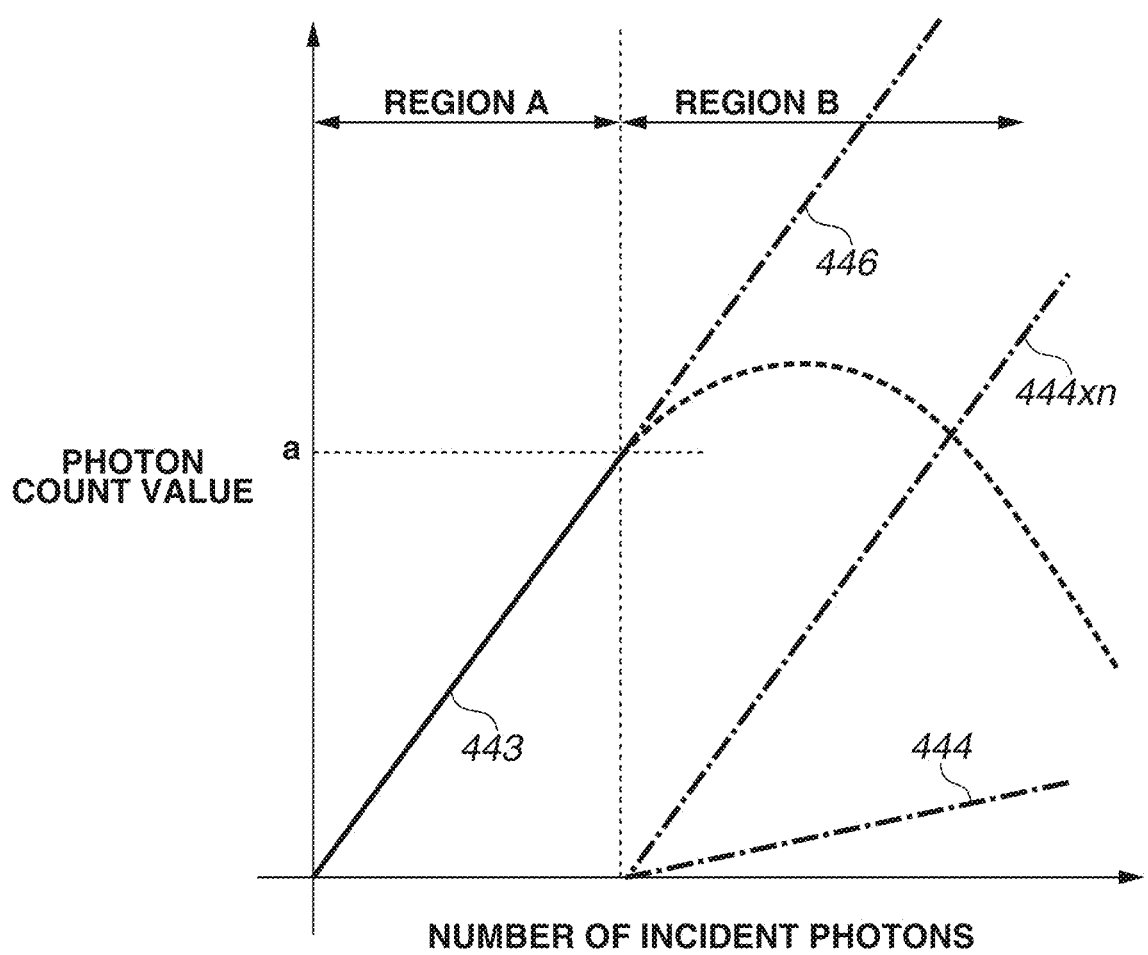
FIG. 10 is a graph illustrating a relationship between the number of incident photons and the number of counted photons.

FIG. 10 is a graph illustrating a relationship between the number of incident photons in unit time and unit area and a photon count value according to the present exemplary embodiment. The horizontal axis indicates the number of incident photons in unit time and unit area, and the vertical axis indicates the photon count value in the counter circuit 120. A plot 443 in FIG. 10 indicates the photon count value corresponding to the APD 143 in FIG. 2. A plot 444 indicates the photon count value corresponding to the APD 144 in FIG. 2. A plot 446 indicates a relationship between the number of incident photons in unit time and unit area after image processing, and the photon count value after calculation processing according to the present exemplary embodiment, with the values plotted in logarithmic scale on both axes.

According to the present exemplary embodiment, for example, the sensitivity ratio between the APDs 143 and 144 is n. This means that the count value corresponding to the APD 143 is n times the count value corresponding to the APD 144 in a state where an equal light quantity is incident.

When light is incident on the APDs 143 and 144, the avalanche multiplication occurs in each APD. The outputs of the APDs 143 and 144 are shaped into pulse waves by the inverter circuits 145 and 146, respectively. The pulse waves output from the inverter circuits 145 and 146 are input to the 0 and 1 terminals of the selection circuits 150, respectively.

An output of the counter circuit 120 is input to the S terminal of the selection circuit 150. When the level of the S terminal is Lo, the selection circuit 150 outputs the input of the 0 terminal, i.e., the output of the APD 143, from the OUT terminal, and the photon count value 443 is counted by the counter circuit 120.

When the output photon count value 443 of the APD 143 exceeds the predetermined threshold value a, the input of the S terminal changes from Lo to Hi. When the level of the S terminal is Hi, the selection circuit 150 outputs the input of the 1 terminal, i.e., the output of the APD 144, from the OUT terminal, and the photon count value 444 is counted by the counter circuit 121.

The OUT terminal of the selection circuit 150 is connected to the counter circuit 120. When the input from the saturation detection circuit 151 to the S terminal of the selection circuit 150 changes and then the output from the OUT terminal of the selection circuit 150 changes to the input from the 1 terminal, the count of the counter circuit 120 is restarted from the initial value of the counter circuit 120. An output of the counter circuit 120 is input to the selection circuit 130. The presence or absence of the saturation of the counter circuit 120 is read out via the saturation detection circuit 151.

The count value input to the selection circuit 130 is read out to the vertical readout circuit 16 by the control signal supplied from SEL. The read count values 443 and 444 are subjected to calculation processing by the signal processing circuit 60. More specifically, when the count value 443 does not exceed the threshold value a (when the incident light quantity is in the range of the region A), the count value 443 is used as the number of photons. On the other hand, when the count value 443 exceeds the threshold value a (when the incident light quantity is in the range of the region B), the linearity of the photon count value is maintained by determining the sum of the result of multiplying the count value 444 by n and the threshold value a to be the number of photons. The threshold value a is, for example, the maximum countable value of the counter circuit 120. As described above, the threshold value a may be an arbitrary value in the countable range of the counter circuit 120. The processing to be applied to the count value 444 is not limited to the multiplication of the value corresponding to the sensitivity ratio between the APDs 143 and 144.

When the input from the saturation detection circuit 151 to the S terminal changes and accordingly the signal to be input to the counter circuit 120 changes, the counter circuit 120 can be reset to restart counting from the initial value of the counter as described above. The same effect as resetting can be obtained by causing the counter circuit 120 to overflow. In either case, a reset and an overflow can be detected by observing the transition of a specific bit, for example, the most significant bit of the counter circuit 120, or a significant bit additionally provided to the number of bits required to achieve the performance of the counter circuit 120. Alternatively, the output count value may be corrected by continuing the counting without resetting the counter circuit 120. In this case, it is not necessary to apply the reset signal to the counter circuit 120, making it possible to further simplify signal processing and to expect the reduction in power consumption.

The present exemplary embodiment changes the APD corresponding to the signal input to the counter circuit 120 based on the change of the magnitude relationship between the count value detected by the saturation detection circuit 151 and the threshold value in this way, and changes correction processing by multiplying the count value depending on the sensitivity ratio between the APDs 143 and 144. This achieves signal output while maintaining the linearity in both the region A where the count value 443 corresponding to the APD 143 is used and the region B where the count value 444 corresponding to the APD 144 is used. This means that the dynamic range can be expanded.

According to the present exemplary embodiment, since each pixel needs to have one counter circuit, the pixel size can be reduced in comparison with that according to the first exemplary embodiment where each pixel has two counter circuits. In addition, the count value of the counter circuit 120 can be reduced, making it possible to reduce the power consumption and to reduce the possibility of the saturation of the count circuit.

According to the present exemplary embodiment, it is not necessary to output the count values of the APDs 143 and 144 from the counter circuit 120. Only the count result of the counter circuit 120 and the saturation signal need to be read out to the signal processing circuit 60, making it possible to increase the reading speed.

In this way, the present exemplary embodiment enables simplifying the photon count processing by changing the signal to be input to the counter circuit 120 based on a threshold count value as a boundary value.

Similar to the first exemplary embodiment, the present exemplary embodiment makes it possible to select which of the signal from the high-sensitivity APD and the signal from the low-sensitivity APD is to be counted first and used to determine the threshold value, depending on issues.

A third exemplary embodiment will be described with reference to FIGS. 11 and 12.

The present exemplary embodiment enables simplifying the photon count processing by deactivating the Geiger mode operation of the APD based on a threshold count value as a boundary value.

Figure 11:
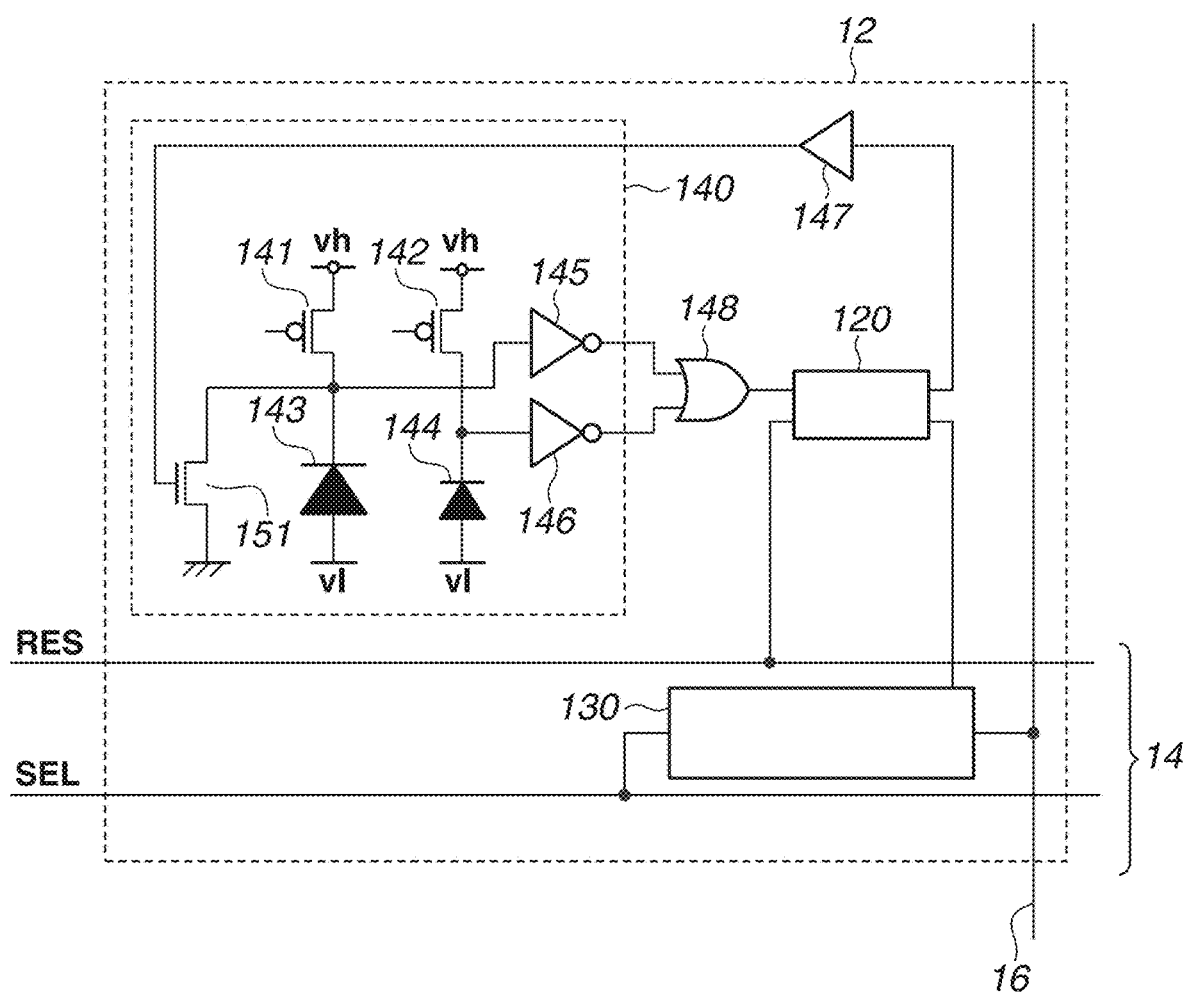
FIG. 11 is a circuit diagram illustrating an example configuration of a pixel circuit of a photoelectric conversion apparatus according to a third exemplary embodiment.

FIG. 11 illustrates an example configuration of a pixel circuit of a photoelectric conversion apparatus according to the present exemplary embodiment.

Elements in FIG. 11 identical to those in FIG. 2 are assigned the same reference numerals as those in FIG. 2, and redundant descriptions thereof will be omitted. Differences from the first exemplary embodiment will be mainly described.

As illustrated in FIG. 11, each pixel 12 includes a photoelectric conversion portion 140, a buffer circuit 147, an OR circuit 148, a counter circuit 120, and a selection circuit 130.

The buffer circuit 147 in FIG. 11 outputs the same logic as that of the count result of the counter circuit 120. The OR circuit 148 inputs the logical sum of the signals of the inverter circuits 145 and 146 to the counter circuit 120.

The photoelectric conversion portion 140 includes an NMOS transistor 151. The gate of the NMOS transistor 151 is connected to the output of the buffer circuit 147. The source is connected to the ground potential, and the drain is connected to the anode terminal of the APD 143.

The counter circuit 120 counts the logical sum of the signals corresponding to the APDs 143 and 144, output from the OR circuit 148.

Figure 12:
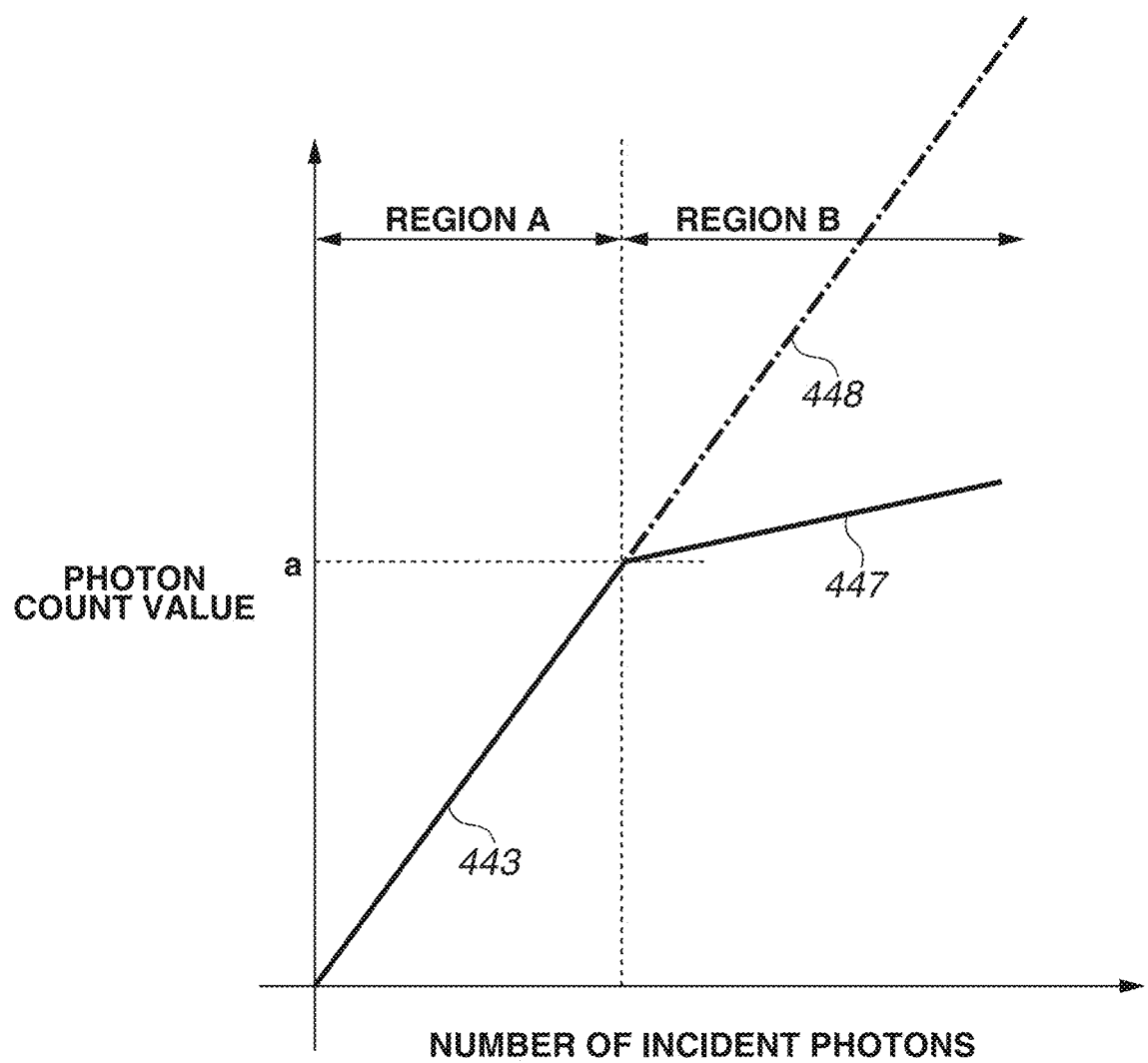
FIG. 12 is a graph illustrating a relationship between the number of incident photons and the number of counted photons.

FIG. 12 is a graph illustrating a relationship between the number of incident photons and the photon count value according to the present exemplary embodiment. The horizontal axis indicates the number of incident photons in unit time and unit area, and the vertical axis indicates the photon count value in the counter circuit 120. A plot 443 in FIG. 12 indicates the sum of the photon count value corresponding to the APD 143 and the photon count value corresponding to the APD 144 in FIG. 2. A plot 447 indicates the sum of the photon count value corresponding to the APD 144 in FIG. 2 and the threshold value a. A plot 448 indicates a relationship between the number of incident photons in unit time and unit area after image processing, and a photon count value after calculation processing according to the present exemplary embodiment, with the values plotted in logarithmic scale on both axes.

Also, according to the present exemplary embodiment, the sensitivity ratio between the APDs 143 and 144 is n. This means that the count value corresponding to the APD 143 is n times the count value corresponding to the APD 144 in a state where an equal light quantity is incident.

When light is incident on the APDs 143 and 144, the avalanche multiplication occurs in each APD. The outputs of the APDs 143 and 144 are shaped into pulse waves by the inverter circuits 145 and 146, respectively. The pulse wave output from each inverter circuit is input to the OR circuit 148.

The output of the OR circuit 148 is input to the counter circuit 120, and a part of the output of the counter circuit 120 is input to the buffer circuit 147. When an output of the counter circuit 120 reaches a predetermined value a, the output of the buffer circuit 147 changes from Lo to Hi. Then, the gate voltage of the NMOS transistor 151 connected with the output of the buffer circuit also changes to the Hi level, and the NMOS transistor 151 turns ON.

The source of the NMOS transistor 151 is connected to the ground voltage. Thus, when the saturation sensor circuit 151 turns ON, the cathode potential of the APD 143 becomes 0V, and the reverse bias voltage applied to the APD 143 becomes lower than or equal to the breakdown voltage. Even if electrons are generated by the incidence of photons in this state, the electrons are discharged via the p-type MOS transistor 141 without causing the avalanche multiplication. Since the current by elementary charges is very small and the voltage drop by the p-type MOS transistor 141 is very small, the signal pulse exceeding the threshold value of the inverter circuit 145 is not output. In other words, the NMOS transistor 151 functions as a switch for stopping the avalanche multiplication of the APD 143.

As a result, when the count value 443 exceeds the threshold value a (when the incident light quantity is in the range of the region B), the avalanche multiplication of the APD 143 stops and the photon counting is not performed. The power consumption can be reduced as the counter output decreases.

When the avalanche multiplication of the APD 143 stops, only the pulse signal corresponding to the APD 144 is input to the counter circuit 120 via the OR circuit 148. As a result, as illustrated in FIG. 12, the photon count value in the region B has a gentler inclination than the photon count value in the region A. More specifically, the plots 443 and 447 give broken line characteristics having a broken point at the threshold value a.

An output of the counter circuit 120 is input to the selection circuit 130. The output of the selection circuit 130 is read out to the vertical readout circuit 16 by the control signal supplied from SEL. The read count values 443 and 447 are subjected to calculation processing by the signal processing circuit 60. More specifically, when the count value 443 is less than or equal to the threshold value a (when the incident light quantity is in the range of the region A), the count value 443 is used as the number of photons. On the other hand, when the count value 443 is larger than or equal to the threshold value a (when the incident light quantity is in the range of the region B), n*(x−a)+a is used as the number of photons, where x denotes the count value 447. The linearity of the photon count value is maintained by this calculation processing. The threshold value a is, for example, the maximum countable value of the counter circuit 120. As described above, the threshold value a may be an arbitrary value in the countable range of the counter circuit 120. The processing to be applied to the count value 444 is not limited to the multiplication of the value corresponding to the sensitivity ratio between the APDs 143 and 144.

As described above, the present exemplary embodiment enables changing control of the avalanche multiplication of the APDs and control whether APD signals are to be added. This enables reducing the power consumption, simplifying the readout circuit, and expanding the dynamic range.

More specifically, the present exemplary embodiment enables simplifying the photon count processing by selecting whether to perform the Geiger mode operation of the APD based on a threshold count value as a boundary value.

Similar to the first exemplary embodiment, it is possible to select which of the signal from the high-sensitivity APD and the signal from the low-sensitivity APD is to be counted first and used to determine the threshold value, depending on the issues.

The photon count processing can also be simplified by starting the Geiger mode operation of the APD based on a threshold count value as a boundary value. Assume an example case according to the present exemplary embodiment where elements equivalent to the buffer circuit 147 and the NMOS transistor 151 connected to the APD 143 are also connected to the APD 144. Firstly, photon counting is started in a state where a voltage higher than or equal to the breakdown voltage is applied only to the APD 143. In this case, only the signal of the APD 143 is input to the OR circuit 148 and output as the photon count value. When the count value output from the counter circuit 120 exceeds the threshold value a, photon counting by the APD 143 stops, as described above. On the other hand, photon counting by the APD 144 may be started by applying a voltage higher than or equal to the breakdown voltage to the APD 144 to start the Geiger mode operation. In such a case since only the signal to be used as the photon count value is counted, the photon count processing can be simplified, enabling power reduction.

Figure 13:
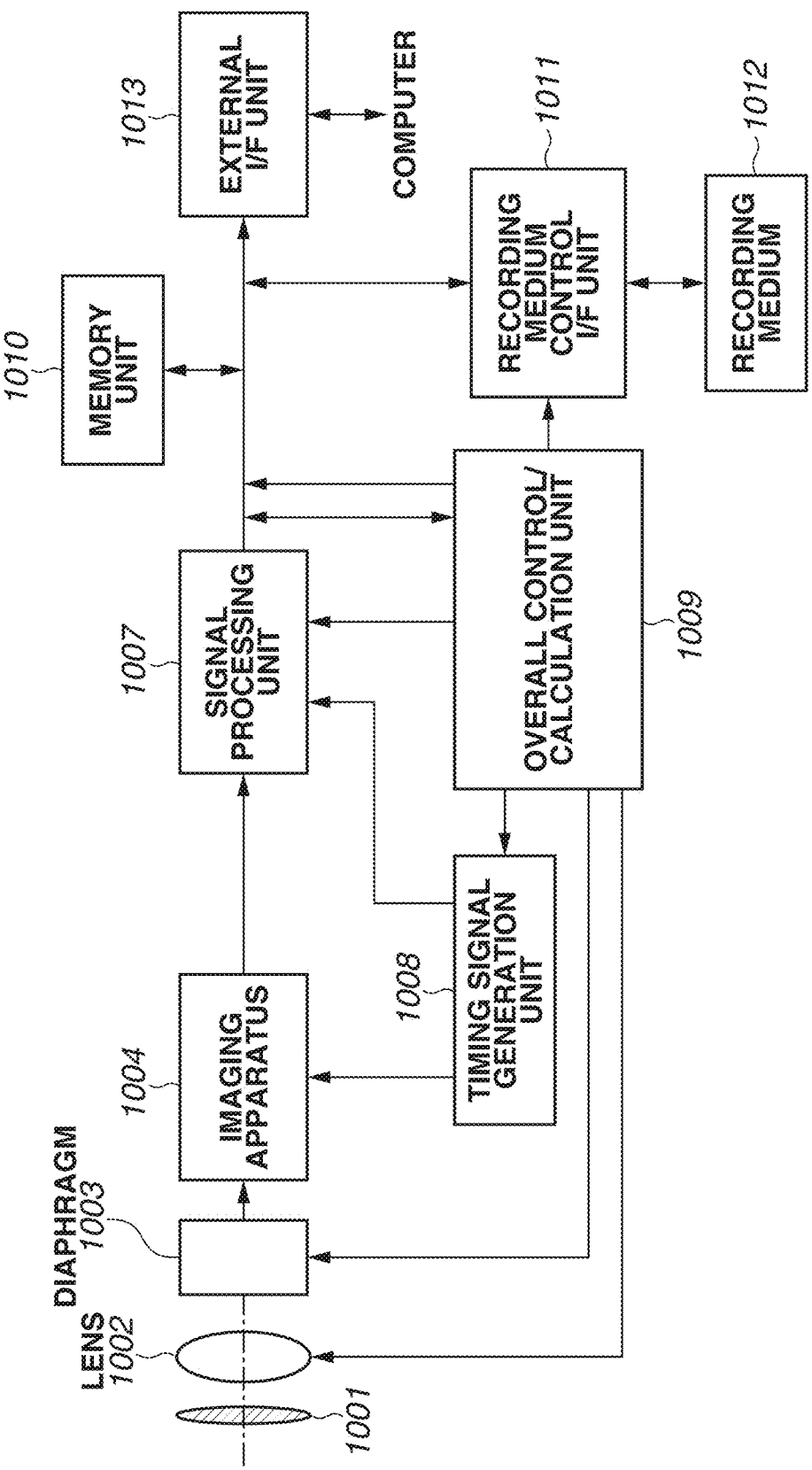
FIG. 13 is a block diagram illustrating an overall configuration of an imaging system according to a fourth exemplary embodiment.

An imaging system according to a fourth exemplary embodiment will be described with reference to FIG. 13. Elements identical to those of the imaging apparatus according to the first to the third exemplary embodiments are assigned the same reference numerals, and redundant descriptions thereof will be omitted or simplified. FIG. 13 is a block diagram illustrating an overall configuration of the imaging system according to the present exemplary embodiment.

Examples of imaging systems include digital still cameras, digital camcorders, camera heads, copying machines, facsimile machines, portable telephones, on-vehicle cameras, and observation satellites. FIG. 13 is a block diagram illustrating a digital still camera as an example of an imaging system.

Referring to FIG. 13, a barrier 1001 protects a lens 1002. The lens 1002 forms an optical image of a subject on an imaging apparatus 1004. A diaphragm 1003 varies the amount of light that passed through the lens 1002. The imaging apparatus according to each of the above-described exemplary embodiments is used as the imaging apparatus 1004.

A signal processing unit 1007 performs correction, data compression, and other processing on the pixel signal output from the imaging apparatus 1004 to acquire an image signal. Referring to FIG. 13, a timing signal generation unit 1008 outputs various timing signals to the imaging apparatus 1004 and the signal processing unit 1007. An overall control/calculation unit 1009 controls the entire digital still camera. A memory unit 1010 is a frame memory unit for temporarily storing image data. A recording medium control I/F unit 1011 is an interface unit for recording and reading data to/from a recording medium. A recording medium 1012, such as a semiconductor memory for recording and reading captured image data, is attachable to and detachable from the digital still camera. An external I/F unit 1013 is an interface unit for communicating with an external computer.

The imaging system needs to include at least the imaging apparatus 1004 and the signal processing unit 1007 for processing the pixel signal output from the imaging apparatus 1004. In this case, other components are disposed outside the imaging system.

As described above, the imaging system according to the present exemplary embodiment uses the imaging apparatus according to one of the first to the third exemplary embodiments as the imaging apparatus 1004. Such a configuration enables expanding the dynamic range of images obtained by the imaging apparatus 1004.

Figure 14A:
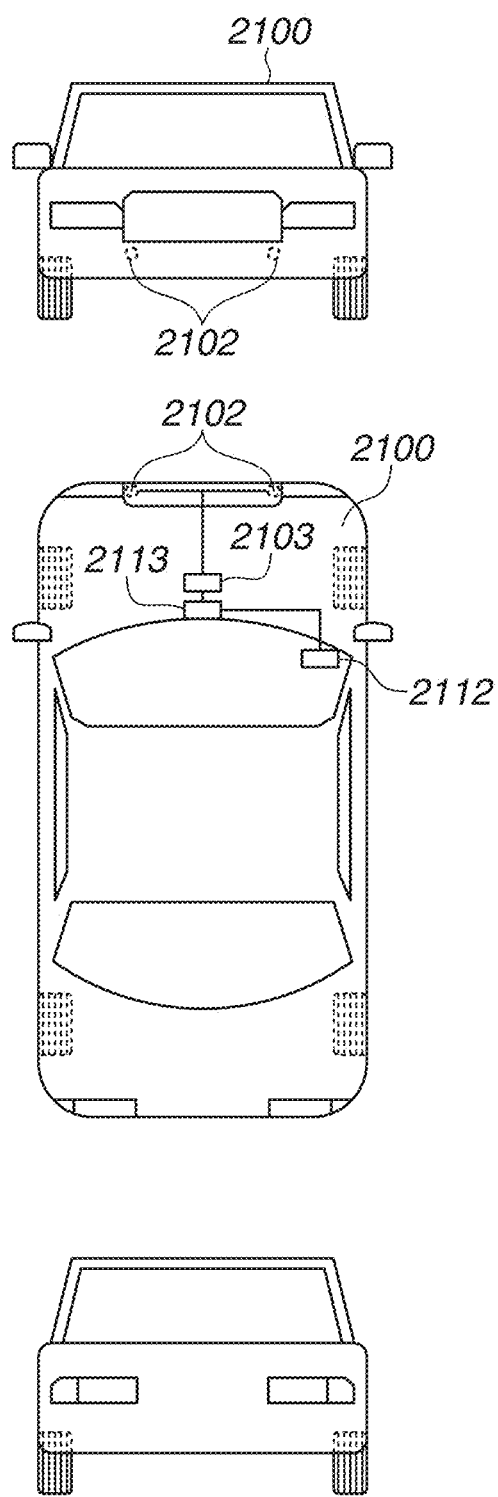
FIGS. 14A and 14B are diagrams respectively illustrating example configurations of an imaging system and a movable body according to a fifth exemplary embodiment.
Figure 14B:
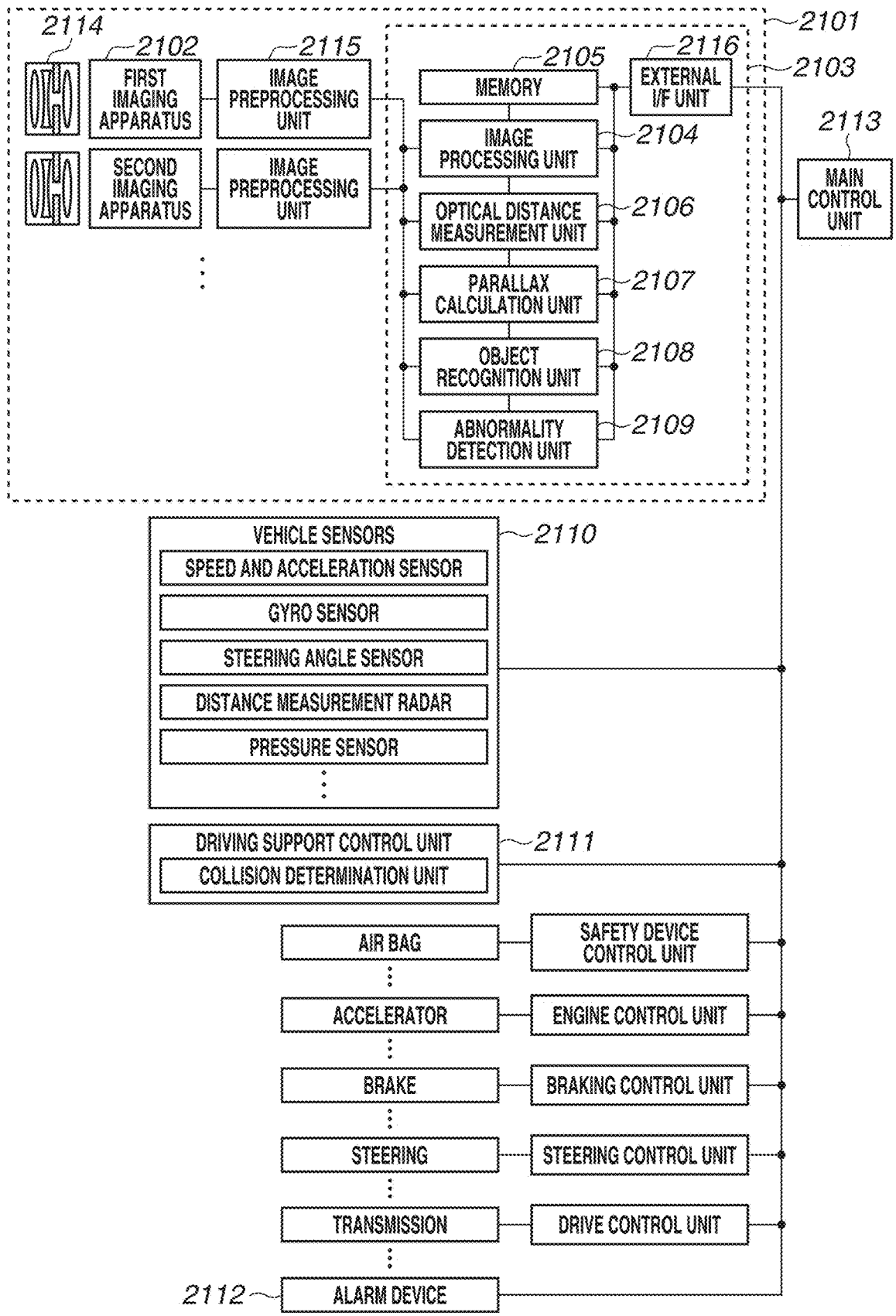

An imaging system and a movable body according to a fifth exemplary embodiment will be described with reference to FIGS. 14A and 14B. FIGS. 14A and 14B illustrate configurations of the imaging system and the movable body according to the fifth exemplary embodiment.

The movable body according to the present exemplary embodiment is an automobile provided with an on-vehicle camera. FIGS. 14A and 14B schematically illustrate the outer appearance and the main inner structure of an automobile 2100, respectively. The automobile 2100 includes an imaging apparatus 2102, an imaging system Application Specific Integrated Circuit (ASIC) 2103, an alarm device 2112, and a main control unit 2113.

The imaging apparatus according to each of the above-described exemplary embodiments is used as the imaging apparatus 2102. The alarm device 2112 warns the driver upon reception of a signal indicating an abnormal condition from the imaging system, vehicle sensors, and control units. The main control unit 2113 totally controls operations of the imaging system, vehicle sensors, and control units. The automobile 2100 does not necessarily need to include the main control unit 2113. In this case, each of the imaging system, vehicle sensors, and control units includes a communication interface, and transmits and receives control signals via a communication network (based on, for example, the Controller Area Network (CAN) standards).

FIG. 14B is a block diagram illustrating a system configuration of the automobile 2100. The automobile 2100 includes a first imaging apparatus 2102 and a second imaging apparatus 2102. This means that the on-vehicle camera according to the present exemplary embodiment is a stereo camera. An object image is formed on the imaging apparatus 2102 by an optical unit 2114. The pixel signal output from the imaging apparatus 2102 is processed by an image preprocessing unit 2115 and then transmitted to the imaging system ASIC 2103. The image preprocessing unit 2115 performs S/N ratio calculation and synchronization signal addition.

The imaging system ASIC 2103 includes an image processing unit 2104, a memory 2105, an optical distance measurement unit 2106, a parallax calculation unit 2107, an object recognition unit 2108, an abnormality detection unit 2109, and an external I/F unit 2116. The image processing unit 2104 processes the pixel signal to generate an image signal. The image processing unit 2104 also corrects the image signal and complements abnormal pixels. The memory 2105 temporarily stores the image signal. The memory 2105 may store the positions of known abnormal pixels of the imaging apparatus 2102. The optical distance measurement unit 2106 performs focusing processing and distance measurement processing for the subject by using the image signal. The parallax calculation unit 2107 performs subject collation (stereo matching) for a parallax image. The object recognition unit 2108 analyzes the image signal to recognize objects such as automobiles, persons, traffic signs, and roads. The abnormality detection unit 2109 detects a failure or malfunction of the imaging apparatus 2102. When the abnormality detection unit 2109 detects a failure or malfunction, it transmits a signal indicating the detection of an abnormality to the main control unit 2113. The external I/F unit 2116 mediates information exchange between each unit of the Imaging system ASIC 2103 and the main control unit 2113 or various control units.

The automobile 2100 includes a vehicle information acquisition unit 2110 and a driving support control unit 2111. The vehicle information acquisition unit 2110 includes vehicle sensors such as a speed and acceleration sensor, a gyro sensor, a steering angle sensor, a distance measurement radar, and a pressure sensor.

The driving support control unit 2111 includes a collision determination unit that determines whether there is a possibility of collision with an object based on information from the optical distance measurement unit 2106, the parallax calculation unit 2107, and the object recognition unit 2108. The optical distance measurement unit 2106 and the parallax calculation unit 2107 are examples of distance information acquisition unit for acquiring information about the distance to an object. More specifically, the distance information includes information about the parallax, the defocus amount, and the distance to an object. The collision determination unit may determine the possibility of collision by using one of these pieces of distance information. The distance information acquisition unit may be implemented by specially designed hardware or a software module.

Although the present exemplary embodiment has been described above centering on an example where the driving support control unit 2111 controls the automobile 2100 to avoid a collision with other vehicles, the present exemplary embodiment is also applicable to automatic driving control for following another vehicle and retaining the vehicle within a lane.

The automobile 2100 is further provided with drive units for driving, such as an air bag, accelerator, brake, steering, and transmission. The automobile 2100 also includes control units for these drive units. The control units control corresponding drive units based on control signals of the main control unit 2113.

The imaging system according to the present exemplary embodiment is applicable not only to automobiles but also to movable bodies (moving apparatuses) such as vessels, airplanes, and industrial robots. In addition, the photoelectric conversion system 701 is applicable not only to movable bodies but also to intelligent transport systems (ITS's) and a wide range of apparatuses that use object recognition.

As described above, in the exemplary embodiments of the automobile, the imaging apparatus according to one of the first to the third exemplary embodiments is used as the imaging apparatus 2102. Such a configuration enables expanding the dynamic range of images obtained by the imaging apparatus 2102.

MODIFICATIONS

The disclosure is not limited to the above-described exemplary embodiments but can be modified in diverse ways.

For example, an example where a part of the configuration of a part of any one of exemplary embodiments is added to other exemplary embodiments or replaced with a part of the configuration of other exemplary embodiments is also an exemplary embodiment of the disclosure.

According to the present exemplary embodiment, two different types of APDs, a high-sensitivity APD and a low-sensitivity APD, are used. However, three or more different types of APDs may be used to change control based on each threshold value. A wider dynamic range is obtained by increasing the number of types of APDs.

According to the exemplary embodiments described above, a plurality of APDs of one pixel is disposed in one n-type semiconductor region 224. However, each APD may be disposed in a different n-type semiconductor region 224. Disposing each APD in a different n-type semiconductor region 224 enables improving the degree of freedom in the arrangement on a substrate.

According to the exemplary embodiments, it is possible to improve the performance of photon count processing of a photoelectric conversion apparatus using avalanche photodiodes.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-101617, filed Jun. 11, 2020, which is hereby incorporated by reference herein in its entirety.

What is claimed is:

1. A photoelectric conversion apparatus comprising:
    a pixel including a first avalanche photodiode and a second avalanche photodiode, wherein a sensitivity to light of the first avalanche photodiode is different from a sensitivity to light of the second avalanche photodiode; and
    a counter circuit configured to count a first signal based on charges generated in the first avalanche photodiode, and a second signal based on charges generated in the second avalanche photodiode,
    wherein a signal on which a count value output from the counter circuit depends is switched between the first signal and the second signal depending on whether the count value is larger than a threshold value or the count value is smaller than the threshold value.

2. The photoelectric conversion apparatus according to claim 1, wherein the count value is compared with the threshold value.

3. The photoelectric conversion apparatus according to claim 2, wherein the first avalanche photodiode starts an avalanche multiplication, when the count value compared with the threshold value reaches the threshold value.

4. The photoelectric conversion apparatus according to claim 3,
    wherein the sensitivity of the first avalanche photodiode is higher than the sensitivity of the second avalanche photodiode, and
    wherein the first avalanche photodiode enters a state where the avalanche multiplication can occur, in a case where a second count value obtained by counting the second signal is smaller than the threshold value when a predetermined time period has elapsed since the start of counting.

5. The photoelectric conversion apparatus according to claim 3, further comprising a switch configured to apply a reverse bias voltage exceeding a breakdown voltage between an anode and a cathode of the first avalanche photodiode.

6. The photoelectric conversion apparatus according to claim 1, wherein a transition of a specific bit value of the counter circuit is detected.

7. The photoelectric conversion apparatus according to claim 1, wherein the counter circuit outputs, as the count value, at least either one of a first count value obtained by counting the first signal and a second count value obtained by counting the second signal.

8. The photoelectric conversion apparatus according to claim 7, further comprising a selection circuit configured to select either one of the first and the second count values according to a magnitude relationship between the first or the second count value and the threshold value.

9. The photoelectric conversion apparatus according to claim 8,
wherein the count circuit includes a first counter circuit connected to the first avalanche photodiode to generate the first count value, and a second counter circuit connected to the second avalanche photodiode to generate the second count value,
wherein an output of the first count circuit is connected to a first input of the selection circuit, and
wherein an output of the second count circuit is connected to a second input of the selection circuit.

10. The photoelectric conversion apparatus according to claim 8,
wherein the sensitivity of the first avalanche photodiode is higher than the sensitivity of the second avalanche photodiode,
wherein, in a case where the first count value is smaller than the threshold value, the first count value is to be selected as the count value, and
wherein, in a case where the first count value is larger than the threshold value, the second count value is to be selected as the count value.

11. The photoelectric conversion apparatus according to claim 7,
wherein the sensitivity of the first avalanche photodiode is higher than the sensitivity of the second avalanche photodiode, and
wherein, in a case where the second count value is smaller than the threshold value when a predetermined time period has elapsed since the second count value has been selected as the count value, the first count value is to be selected as the count value.

12. The photoelectric conversion apparatus according to claim 7, wherein a signal input to the counter circuit is changed, when the first count value reaches the threshold value, from the first to the second signal, and accordingly a processing on the count value is changed from processing for counting the first count value to processing for counting the second count value.

13. The photoelectric conversion apparatus according to claim 12, further comprising a selection circuit configured to select either one of the first and the second signals as a signal to be input to the counter circuit.

14. The photoelectric conversion apparatus according to claim 12, wherein each pixel has one counter circuit.

15. The photoelectric conversion apparatus according to claim 7,
wherein the sensitivity of the first avalanche photodiode is higher than the sensitivity of the second avalanche photodiode, and
wherein a signal input to the counter circuit is changed, when the first count value exceeds the threshold value, from the first to the second signal.

16. The photoelectric conversion apparatus according to claim 7,
wherein the sensitivity of the first avalanche photodiode is higher than the sensitivity of the second avalanche photodiode, and
wherein, in a case where the second count value is smaller than the threshold value when a predetermined time period has elapsed since when the second count value is to be selected as the count value, a signal to be input to the counter circuit is changed from the second to the first signal.

17. The photoelectric conversion apparatus according to claim 1, wherein an avalanche multiplication of the first avalanche photodiode stops, when the count value compared with the threshold value reaches the threshold value.

18. The photoelectric conversion apparatus according to claim 17,
wherein the sensitivity of the first avalanche photodiode is higher than the sensitivity of the second avalanche photodiode, and
wherein the avalanche multiplication of the first avalanche photodiode stops, when the count value as a sum of count values of the first and the second signals exceeds the threshold value.

19. The photoelectric conversion apparatus according to claim 17, further comprising a switch configured to control a voltage to be applied to the first avalanche photodiode, wherein the voltage to be applied to the first avalanche photodiode becomes lower than or equal to a breakdown voltage, when the count value reaches the threshold value.

20. The photoelectric conversion apparatus according to claim 17, further comprising a circuit configured to output a logical sum of the first and the second signals.

21. The photoelectric conversion apparatus according to claim 17,
wherein the sensitivity of the first avalanche photodiode is higher than the sensitivity of the second avalanche photodiode, and
wherein the first avalanche photodiode stops the avalanche multiplication, and the second avalanche photodiode enters a state where the avalanche multiplication can occur, in a case where the count value is larger than the threshold value.

22. The photoelectric conversion apparatus according to claim 1, wherein the first avalanche photodiode is configured by electrically connecting semiconductor regions separated from each other in a semiconductor substrate, using a conductive member.

23. The photoelectric conversion apparatus according to claim 1, wherein an area of a light receiving surface of the first avalanche photodiode is different from an area of a light receiving surface of the second avalanche photodiode.

24. The photoelectric conversion apparatus according to claim 1, further comprising a micro lens, wherein, in the pixel, the first and the second avalanche photodiodes are disposed under the same micro lens.

25. The photoelectric conversion apparatus according to claim 24, wherein an avalanche photodiode disposed under the center of the micro lens is set as the first avalanche photodiode, and an avalanche photodiode disposed under the outer periphery of the micro lens is set as the second avalanche photodiode.

26. An imaging system comprising:
the photoelectric conversion apparatus according to claim 1; and
a processing apparatus configured to process a signal output from the photoelectric conversion apparatus.

27. A movable body comprising:
the photoelectric conversion apparatus according to claim 1;
a processing apparatus configured to process a signal output from the photoelectric conversion apparatus; and
a control unit configured to control the movable body based on a result of the processing.

28. A photoelectric conversion apparatus comprising:
a pixel including a first avalanche photodiode and a second avalanche photodiode, wherein a sensitivity to light of the first avalanche photodiode is different from a sensitivity to light of the second avalanche photodiode; and
a counter circuit configured to count a first signal based on charges generated in the first avalanche photodiode, and a second signal based on charges generated in the second avalanche photodiode,
wherein the first and the second signals are pulse signals each corresponding to a voltage change by an occurrence of the avalanche multiplication,
wherein a count value output from the counter circuit changes in response to at least either one of changes of the first and the second signals, and
a signal on which the count value output from the counter circuit depends is switched between the first signal and the second signal depending on whether the count value is larger than a threshold value or the count value is smaller than the threshold value.

29. A photoelectric conversion apparatus comprising:
a pixel including a first avalanche photodiode and a second avalanche photodiode having different sensitivity to light; and
a counter circuit configured to count a first signal based on charges generated in the first avalanche photodiode, and a second signal based on charges generated in the second avalanche photodiode,
wherein a signal on which a count value output from the counter circuit depends is switched between the first signal and the second signal depending on whether the count value is larger than a threshold value or the count value is smaller than the threshold value, and
wherein the count value is multiplied by a value corresponding to a sensitivity ratio between the first and the second avalanche photodiodes.

30. A photoelectric conversion apparatus comprising:
a pixel including a first avalanche photodiode and a second avalanche photodiode, wherein a sensitivity to light of the first avalanche photodiode is different from a sensitivity to light of the second avalanche photodiode, and a counter circuit,
wherein the counter circuit counts both or either one of a first signal based on charges generated in the first avalanche photodiode and a second signal based on charges generated in the second avalanche photodiode, and
wherein a signal on which a count value output from the counter circuit depends is switched between the first signal and the second signal, depending on whether the count value output from the counter circuit does not reach a threshold value or has exceeded the threshold value.

31. A photoelectric conversion apparatus comprising:
a pixel including a first avalanche photodiode and a second avalanche photodiode, wherein a sensitivity to light of the first avalanche photodiode is different from a sensitivity to light of the second avalanche photodiode;
a counter circuit configured to count a first signal based on charges generated in the first avalanche photodiode, and a second signal based on charges generated in the second avalanche photodiode; and
a selection circuit configured to select either one of the first or the second signals,
wherein a signal on which a count value output from the counter circuit depends is switched between the first signal and the second signal, depending on whether the count value output from the counter circuit does not reach a threshold value or has exceeded the threshold value.

* * * * *